(12) United States Patent
DeJule et al.

(10) Patent No.: US 12,433,411 B2
(45) Date of Patent: *Oct. 7, 2025

(54) CHAIR INCLUDING A LEAF SPRING IN CONTACT WITH A LINKAGE TO PROVIDE RESISTANCE TO TILTING OF A BACKREST OF THE CHAIR

(71) Applicant: Aaron DeJule, River Forest, IL (US)

(72) Inventors: Aaron DeJule, River Forest, IL (US); Paul C. Evans, Emmet, MI (US); Scott Padiak, River Forest, IL (US)

(73) Assignee: Aaron DeJule, River Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,135

(22) Filed: Apr. 2, 2024

(65) Prior Publication Data

US 2024/0268560 A1  Aug. 15, 2024

Related U.S. Application Data

(63) Continuation of application No. 18/348,515, filed on Jul. 7, 2023, now Pat. No. 11,950,710, and a
(Continued)

(51) Int. Cl.
*A47C 7/44* (2006.01)
*A47C 1/032* (2006.01)
*A47C 31/12* (2006.01)

(52) U.S. Cl.
CPC ............ *A47C 7/44* (2013.01); *A47C 1/03266* (2013.01); *A47C 1/03277* (2013.01);
(Continued)

(58) Field of Classification Search
CPC ..... A47C 7/445; A47C 7/441; A47C 1/03277; A47C 1/03266

See application file for complete search history.

(56) References Cited

U.S. PATENT DOCUMENTS 4,761,033 A  8/1988  Lanuzzi et al.
4,911,501 A  3/1990  Decker et al.
(Continued)

FOREIGN PATENT DOCUMENTS

| | | |
|---|---|---|
| DE | 3700447 A1 | 1/1987 |
| WO | WO/2016/146582 A2 | 9/2016 |
| WO | WO/2017/157943 A1 | 9/2017 |

OTHER PUBLICATIONS

Aaron DeJule, "Self Adjusting Tension Control", U.S. Appl. No. 62/114,706, filed Feb. 11, 2015, 9 pgs.
(Continued)

*Primary Examiner* — Timothy J Brindley
(74) *Attorney, Agent, or Firm* — Morgan, Lewis & Bockius LLP

(57) ABSTRACT

A chair, comprising, a backrest, a seat coupled with the backrest, a column coupled with the seat, a linkage statically attached to the backrest and rotatably attached below the seat, a leaf spring statically attached at one end and in direct contact with the linkage to provide a resistance to tilting of the backrest relative to the column. A first structure fixed to the column, where a portion of the first structure has an arc shape that includes one or more teeth, and a second structure in contact with the first structure, wherein a portion of the second structure includes one or more teeth. The chair is configured such that, when a weight is applied to the seat, the one or more teeth of the second structure, a pivot point at which the backrest is configured to tilt relative to the column, and the linkage are configured to move together.

30 Claims, 12 Drawing Sheets

Related U.S. Application Data continuation of application No. 18/348,564, filed on Jul. 7, 2023, now Pat. No. 11,998,118, and a continuation of application No. 18/348,596, filed on Jul. 7, 2023, now Pat. No. 11,944,210, said application No. 18/348,564 is a continuation of application No. 18/134,012, filed on Apr. 12, 2023, now Pat. No. 11,744,374, which is a continuation of application No. 18/104,268, filed on Jan. 31, 2023, now Pat. No. 11,744,373, which is a continuation of application No. 17/150,679, filed on Jan. 15, 2021, now Pat. No. 11,596,235, which is a continuation-in-part of application No. 16/408,650, filed on May 10, 2019, now Pat. No. 10,893,753, which is a continuation of application No. 15/040,735, filed on Feb. 10, 2016, now Pat. No. 10,292,498.

(60) Provisional application No. 62/114,706, filed on Feb. 11, 2015.

(52) U.S. Cl.
CPC ............. *A47C 7/441* (2013.01); *A47C 7/443* (2013.01); *A47C 7/445* (2013.01); *A47C 7/4454* (2018.08); *A47C 31/126* (2013.01)

(56) References Cited

U.S. PATENT DOCUMENTS

| | | | |
|---|---|---|---|
| 4,962,962 | A | 10/1990 | Machate et al. |
| 5,080,318 | A | 1/1992 | Takamatsu et al. |
| 5,348,372 | A | 9/1994 | Takamatsu et al. |
| 6,250,715 | B1 | 6/2001 | Caruso et al. |
| 7,234,772 | B2 | 6/2007 | Wells |
| 7,600,814 | B2 | 10/2009 | Link |
| 7,625,045 | B2 | 12/2009 | Hatcher et al. |
| 7,857,390 | B2 | 12/2010 | Schmitz et al. |
| 7,992,937 | B2 | 8/2011 | Plikat et al. |
| 8,025,334 | B2 | 9/2011 | Schmitz et al. |
| 8,146,990 | B2 | 4/2012 | Bock |
| 8,991,921 | B2 | 3/2015 | Peterson et al. |
| 9,560,917 | B2 | 2/2017 | Roslund, Jr. |
| 10,292,498 | B2 | 5/2019 | DeJule et al. |
| 10,624,457 | B2 | 4/2020 | Schmitz et al. |
| 10,893,753 | B2 | 1/2021 | DeJule et al. |
| 2006/0202530 | A1 | 9/2006 | Lin |
| 2008/0084100 | A1 | 4/2008 | Curiger |
| 2008/0088163 | A1 | 4/2008 | Sander et al. |
| 2009/0261637 | A1 | 10/2009 | Schmitz et al. |
| 2009/0267394 | A1 | 10/2009 | Bock |
| 2012/0025574 | A1 | 2/2012 | Wilkinson et al. |
| 2013/0169017 | A1 | 7/2013 | Masunaga et al. |
| 2015/0123441 | A1 | 5/2015 | Duke |
| 2016/0100691 | A1 | 4/2016 | Masunaga et al. |
| 2018/0153306 | A1 | 6/2018 | Schmitz et al. |
| 2019/0029440 | A1 | 1/2019 | Schmitz et al. |

OTHER PUBLICATIONS

Aaron DeJule, "Apparatus With Weight Responsive Changeable Adjusting Characteristics", U.S. Appl. No. 17/150,679, filed Jan. 15, 2021, 74 pgs.
DeJule, Office Action, U.S. Appl. No. 15/040,735, Jun. 26, 2018, 9 pgs.
DeJule, Notice of Allowace, U.S. Appl. No. 15/040,735, Jan. 2, 2019, 9 pgs.
DeJule, Notice of Allowace, U.S. Appl. No. 16/408,650, Sep. 21, 2020, 9 pgs.
DeJule, Office Action, U.S. Appl. No. 17/150,679, Jan. 28, 2022, 10 pgs.
DeJule, Notice of Allowance, U.S. Appl. No. 17/150,679, Nov. 1, 2022, 5 pgs.
DeJule, Notice of Allowance, U.S. Appl. No. 18/104,268, Apr. 18, 2023, 9 pgs.
DeJule, Notice of Allowance, U.S. Appl. No. 18/134,012, Jun. 28, 2023, 8 pgs.
DeJule, Office Action, U.S. Appl. No. 18/348,564, Sep. 18, 2023, 11 pgs.
DeJule, Notice of Allowance, U.S. Appl. No. 18/348,564, Jan. 24, 2024, 7 pgs.
DeJule, Office Action, U.S. Appl. No. 18/348,596, Sep. 19, 2023, 8 pgs.
DeJule, Notice of Allowance, U.S. Appl. No. 18/348,596, Dec. 14, 2023, 7 pgs.
DeJule, Notice of Allowance, U.S. Appl. No. 18/348,515, Feb. 28, 2024, 7 pgs.
Erik S. Maurer, Banner Witcoff, Letter to John S. Mortimer dated Jan. 24, 2022 via Email, Re: MillerKnol / Aaron DeJule, 8 pgs.
Koepke, Marcus, Furniture and Product Designer, Curriculum Vitae, Founder/Owner of Marcus Curtis Design, 1990-Present, mkoepke@marcuscurtisdesign.com, Marco Island, Florida, 2 pgs.
*Millerknoll, Inc.* Petitioner v. *Aaron DeJule*, Patent Owner, Petition for Inter Partes Review Under 35 U.S.C.§§ 311-319 and 37 C.F.R..§ 42.100 et seq., U.S. Pat. No. 10,893,753, Filing Date May 10, 2019 Issued Jan. 19, 2021, Inter Parts Review No. IPR2023-01427, Sep. 20, 2023, 123 pgs.
Exhibit 1001, U.S. Pat. No. 10,893,753 ("the '753 Patent"), Sep. 20, 2023.
Exhibit 1002, U.S. Pat. No. 10,292,498 ("the '498 Patent"), Sep. 20, 2023.
Exhibit 1003, U.S. Appl. No. 62/114,706 ("the Provisional"), filed Sep. 20, 2023.
Exhibit 1004, File History for U.S. Appl. No. 15/040,735, filed Sep. 20, 2023.
Exhibit 1005, File History for U.S. Appl. No. 16/408,650, filed Sep. 20, 2023.
Exhibit 1006, U.S. Patent App. Publication No. 2009/0261637 A1 ("Schmitz'637"), Sep. 20, 2023.
Exhibit 1007, U.S. Pat. No. 5,348,372 ("Takamatsu"), Sep. 20, 2023.
Exhibit 1008, U.S. Pat. No. 10,531,738 ("Schmitz '738"), Sep. 20, 2023.
Exhibit 1009, Excerpts from File History for U.S. Appl. No. 15/565,495, filed Sep. 20, 2023.
Exhibit 1010, German Application DE 10 2015 003 156.2 ("DE '156"), Sep. 20, 2023.
Exhibit 1011, Certified English Translation of German Application DE 10 2015 003 156.2, Sep. 20, 2023.
Exhibit 1012, Declaration of Marcus C. Koepke, Sep. 20, 2023.
Exhibit 1013, Marcu C. Koepke CV, Sep. 20, 2023.
Exhibit 1014, Declaration of Alexander J. Bruening, Sep. 20, 2023.
Exhibit 1015, U.S. Pat. No. 7,992,936 ("Schmitz '936"), Sep. 20, 2023.
*Millerknoll, Inc.* Petitioner v. *Aaron Dejule*, Patent Owner, U.S. Pat. No. 10,893,753, Filing Date May 10, 2019, Issued Jan. 19, 2021, Inter Partes Review No. IPR2023-01427, Declaration of Marcus C. Koepke in Support of Petition for Inter Partes Review, Sep. 20, 2023, 188 pgs.
*Millerknoll, Inc.* Petitioner v. *Aaron DeJule and Scott Padiak*, Patent Owners, U.S. Pat. No. 10,292,498, Filing Date Feb. 10, 2016, Issued May 21, 2019, Petition for Inter Partes Review Under 35 U.S.C.§§ 311-319 and 37 C.F.R.. § 42.100 et seq., Inter Partes Review No. IPR2023-01428, Sep. 20, 2023, 101 pgs.
Exhibit 1101, U.S. Pat. No. 10,292,498 ("the '498 Patent"), Sep. 20, 2023.
Exhibit 1102, File History for U.S. Appl. No. 15/040,735, filed Sep. 20, 2023.
Exhibit 1103, U.S. Pat. No. 5,080,318 ("Takamatsu '318"), Sep. 20, 2023.
Exhibit 1104, U.S. Pat. No. 5,348,372 ("Takamatsu '372"), Sep. 20, 2023.
Exhibit 1105, US.S. Patent App. Publication No. 2009/0261637 A1 ("Schmitz 637"), Sep. 20, 2023.
Exhibit 1106, U.S. Patent Appl. Publication No. 2012/0038195 A1 ("Lee"), Sep. 20, 2023.

(56) References Cited

OTHER PUBLICATIONS

Exhibit 1107, International Publication No. WO/2010/120139A1, Sep. 20, 2023,.
Exhibit 1108, Declaration of Marcus C. Koepke, Sep. 20, 2023.
Exhibit 1109, Marcu C. Koepke CV, Sep. 20, 2023.
*Millerknoll, Inc.* Petitioner v. *Aaron Dejule and Scott Padiak*, Patent Owners, U.S. Pat. No. 10,292,498, Filing Date Feb. 10, 216, Issued May 21, 2019, Inter Partes Review No. IPR2023-01428, Declaration of Marcus C. Koepke in Support of Petition for Inter Partes Review, Sep. 20, 2023, 133 pgs.
*Millerknoll, Inc.* Petitioner v. *Aaron DeKule*, Patent Owner, U.S. Pat. No. 10,893,753, Filing Date May 10, 2019, Issued Jan. 19, 2021, Inter Partes Review No. IPR2023-01427, Petitioner's Power of Attorney, Sep. 20, 2023, 2 pgs.
*Millerknoll, Inc.* Petitioner v. *Aaron DeKule*, Patent Owner, Patent Owner's Mandatory Notices, U.S. Pat. No. 10,292,498, Inter Partes Review No. IPR2023-01428, Patent Owner's Mandatory Notices Pursuant to 37 C.F.R. § 42.8(a)(2), Oct. 11, 2023, 4 pgs.
*Millerknoll, Inc.* Petitioner v. *Aaron DeKule*, Patent Owner, U.S. Pat. No. 10,893,753, Filing Date May 10, 2019, Issued Jan. 19, 2021, Inter Partes Review No. IPR2023-01427, Declaration of Alexander J. Bruening, Sep. 20, 2023, 3 pgs.
*Millerknoll, Inc.* Petitioner v. *Aaron DeKule*, Patent Owner, U.S. Pat. No. 10,893,753, Inter Partes Review No. IPR2023-01427, Patent Owner's Mandatory Notices Pursuant to 37 C.F.R. § 42.8(a)(2), Oct. 11, 2023, 4 pgs.
*Aaron Dejule* Plaintiff, v. *Millerknoll, Inc.*, Defendant, Defendant Millerknoll, Inc.'S Preliminary Invalidity Contentions, Civil Action No. 1:23-CV-00969-RJJ-SJB, Jan. 31, 2024, 444 pgs.
Herman Miller, Cosm® Chair, Apr. 17, 2018, In Milan, Herman Miller Presents "For You Everyone," an exhibition to introduce the revolutionary new seating line, Cosm, by Studio 7.5, 4 pgs.

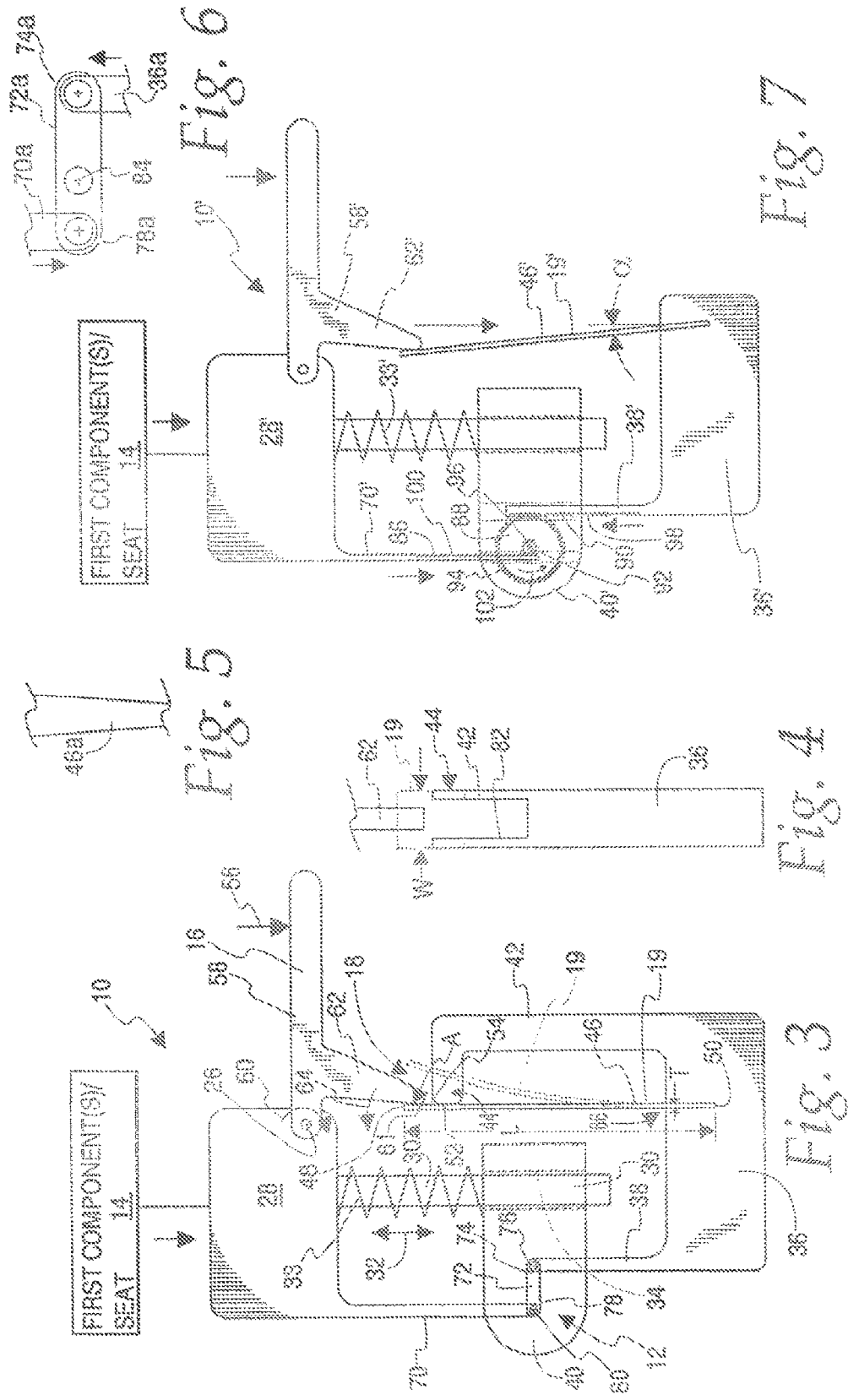

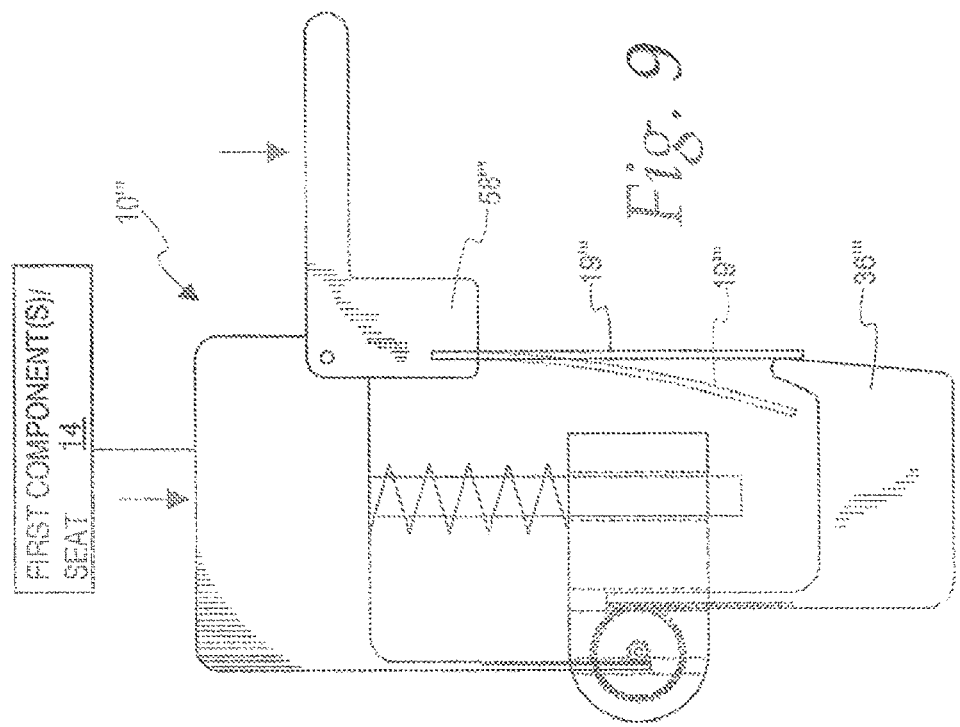
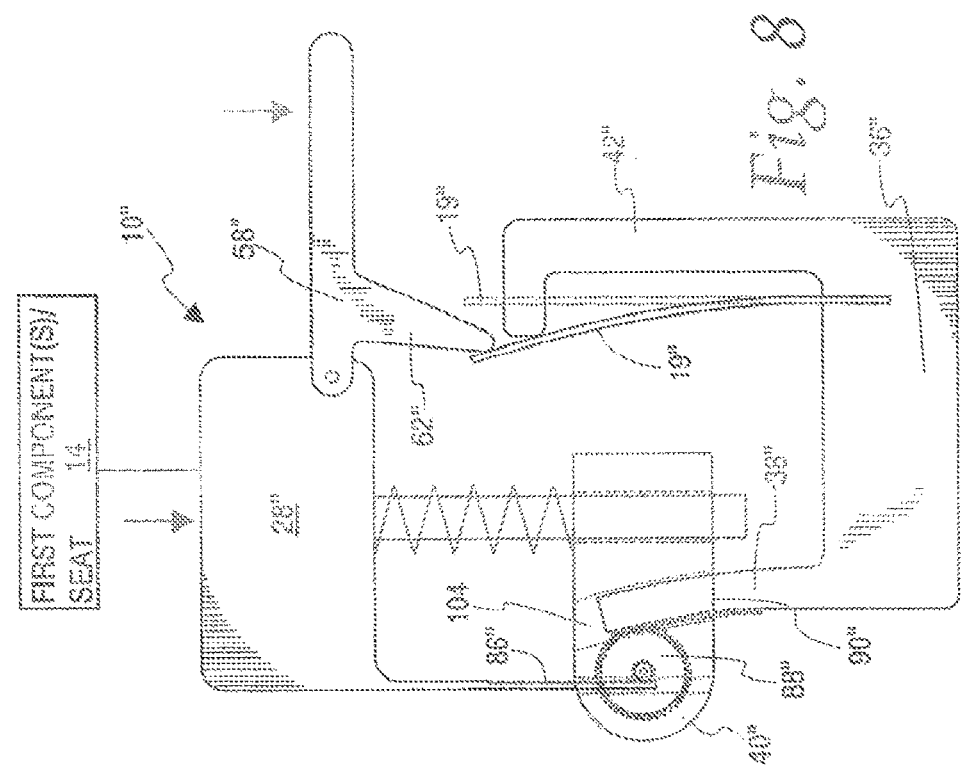

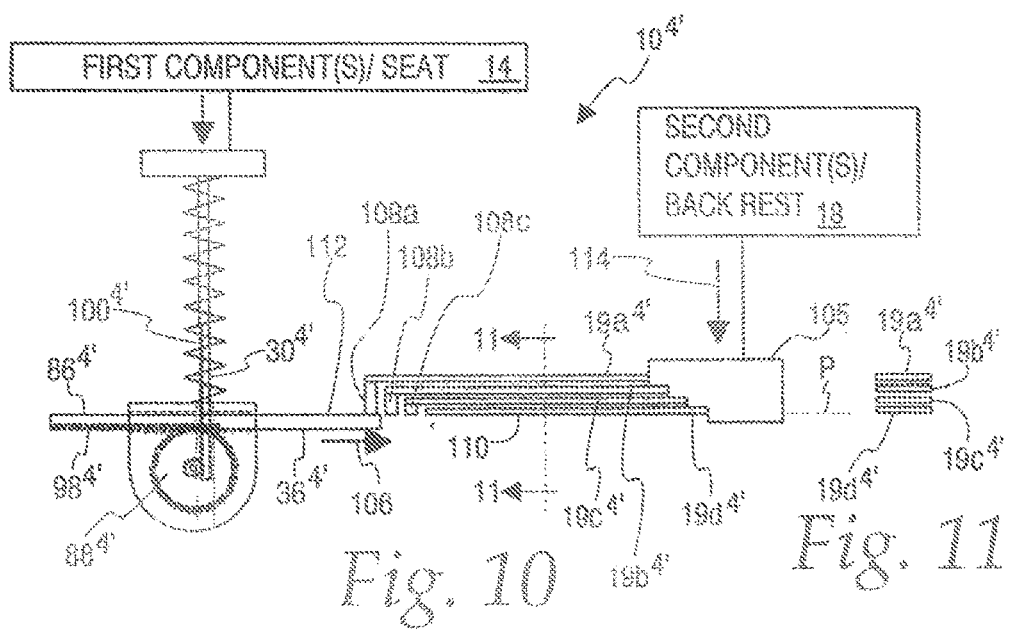
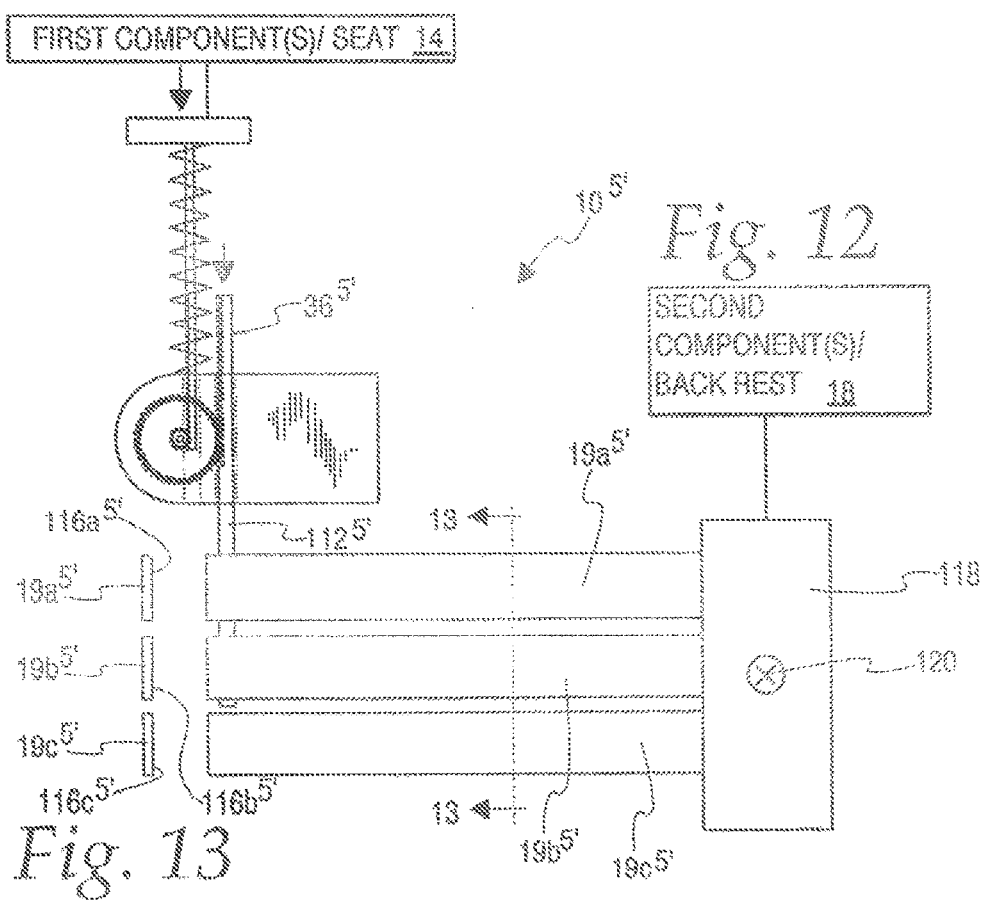

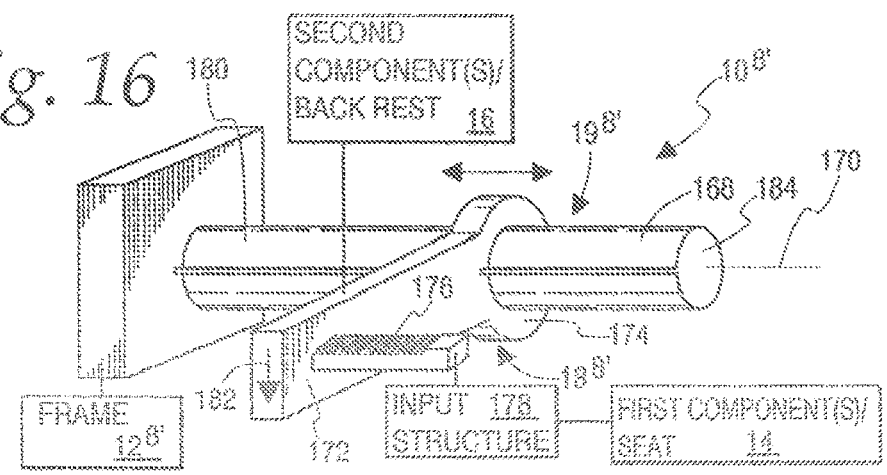

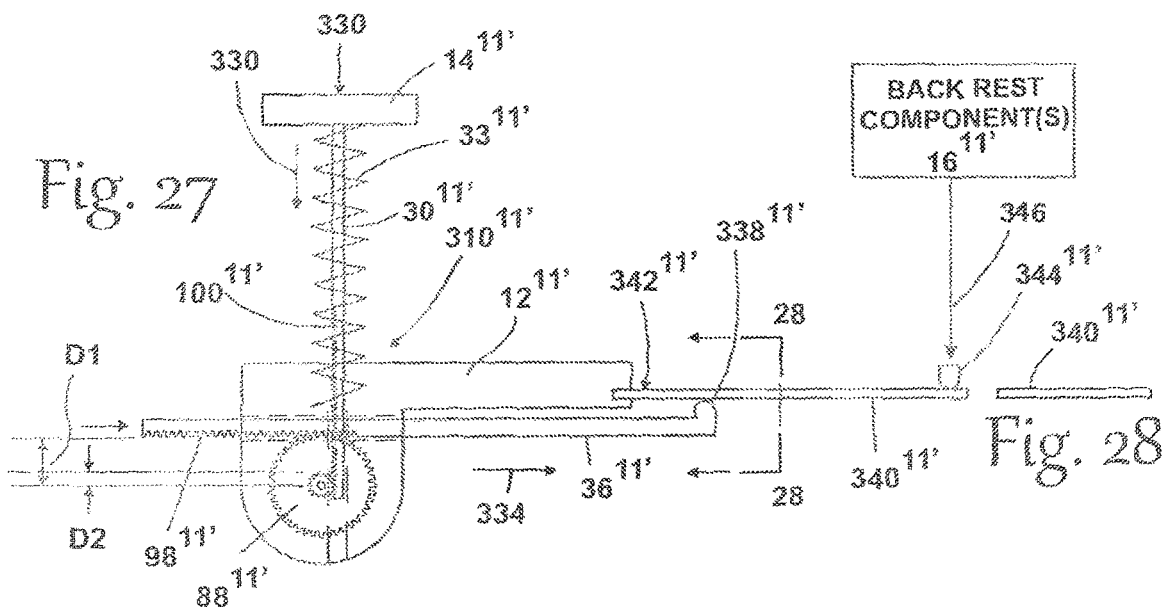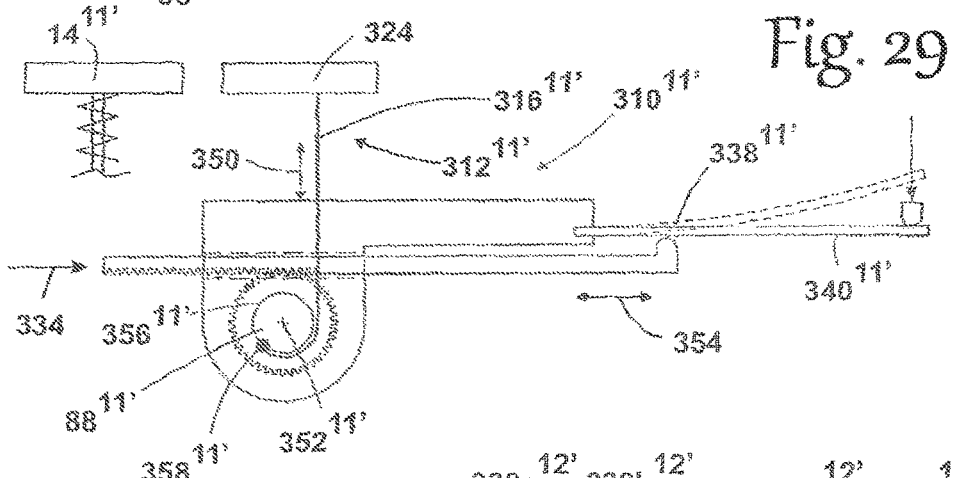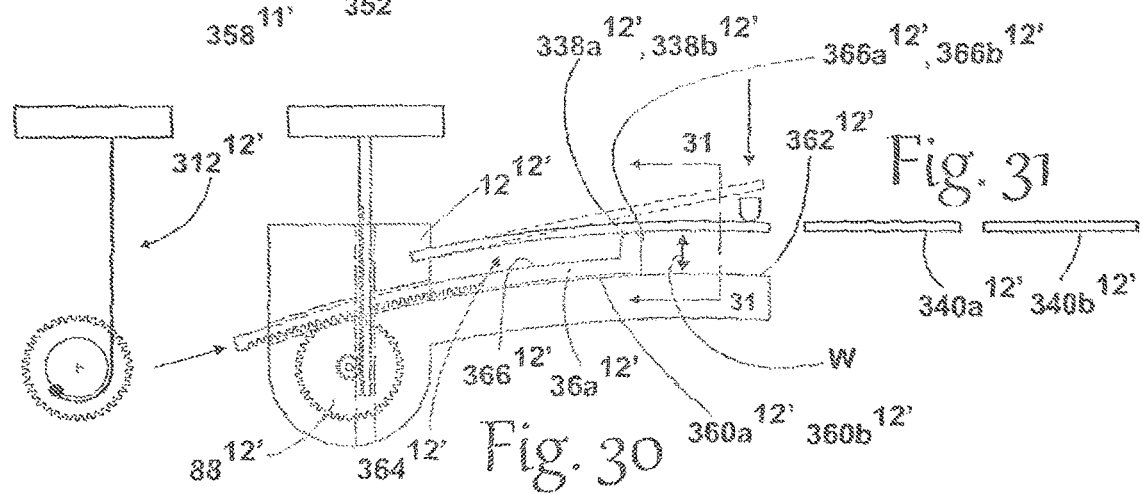

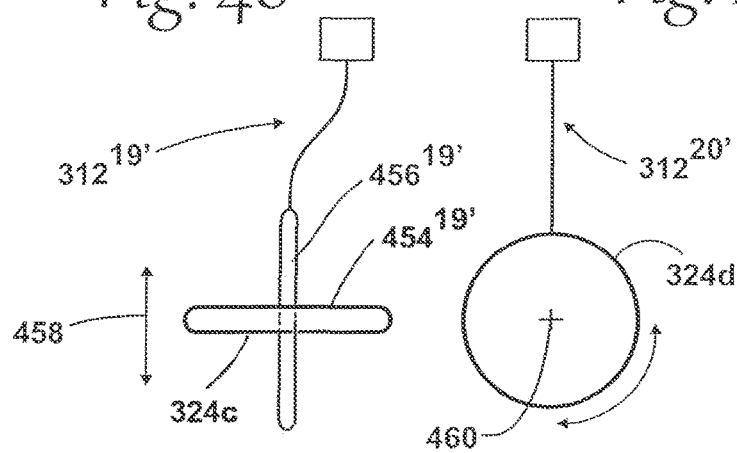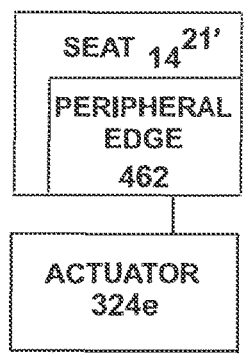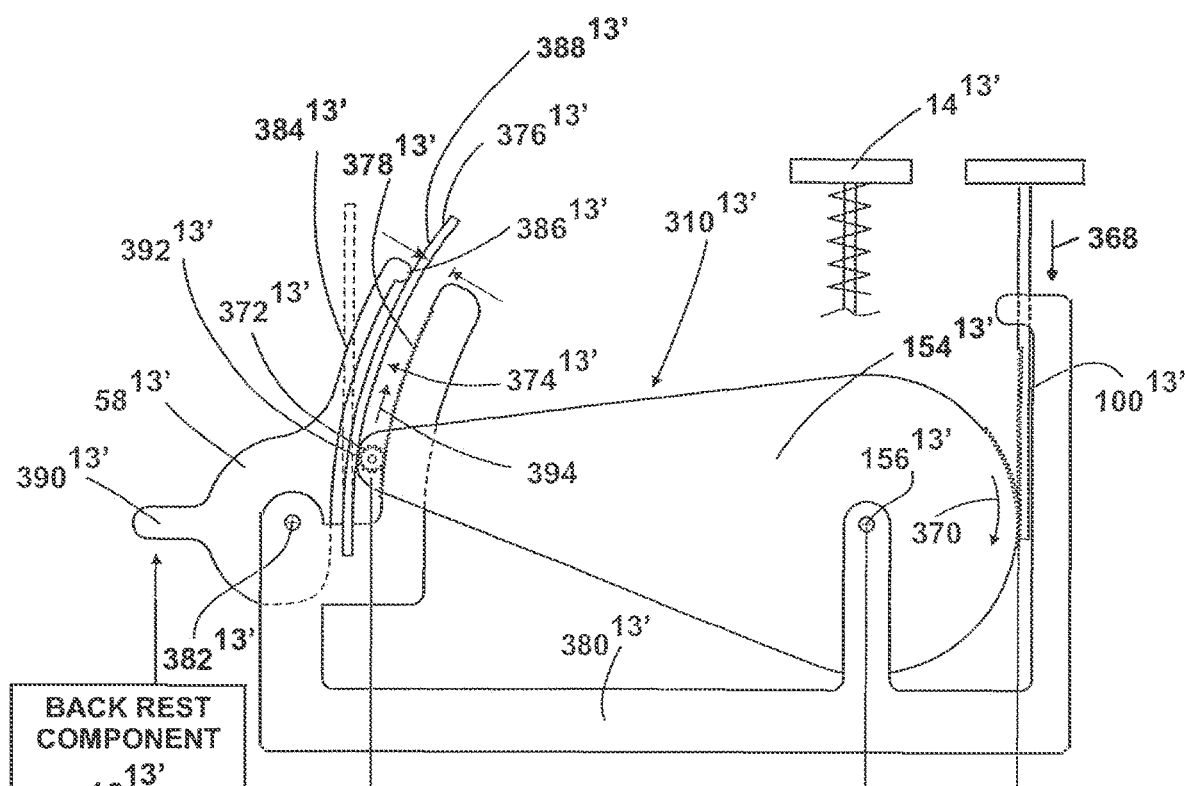

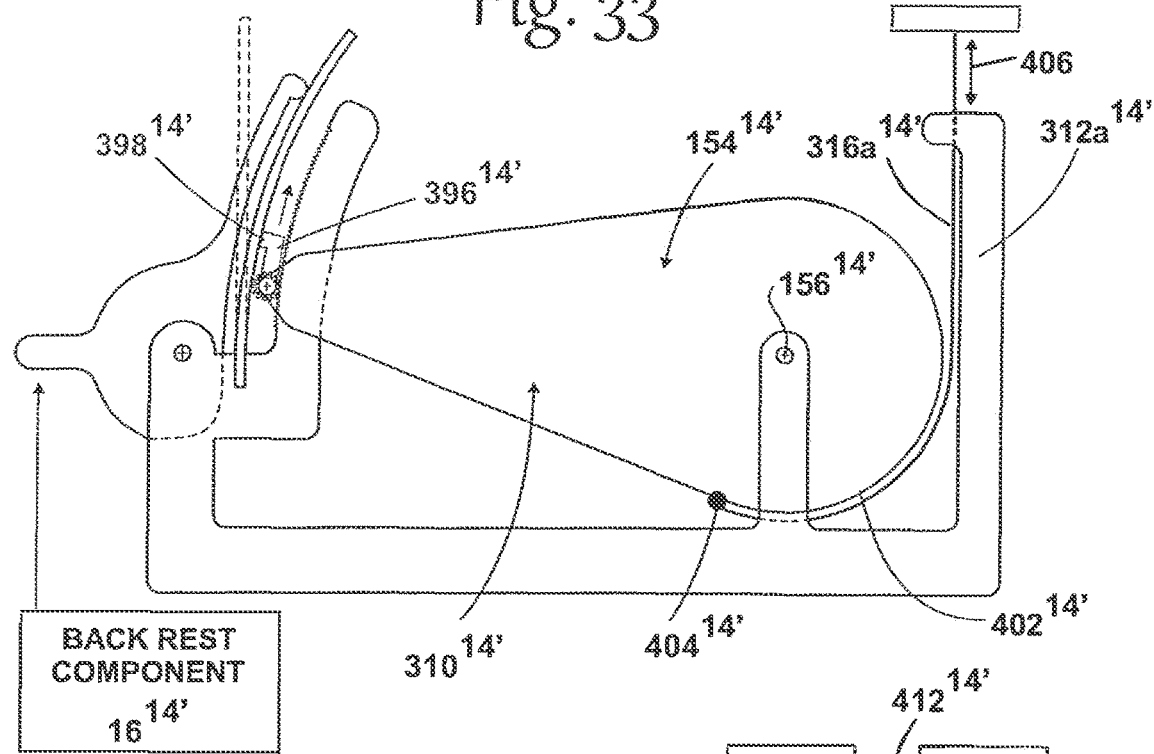
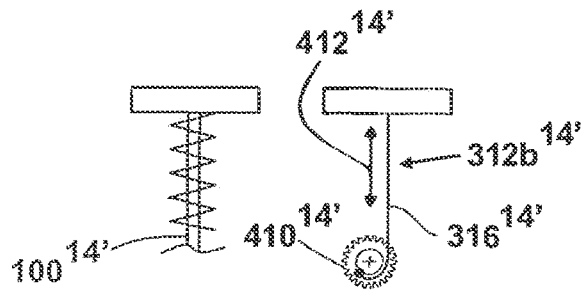
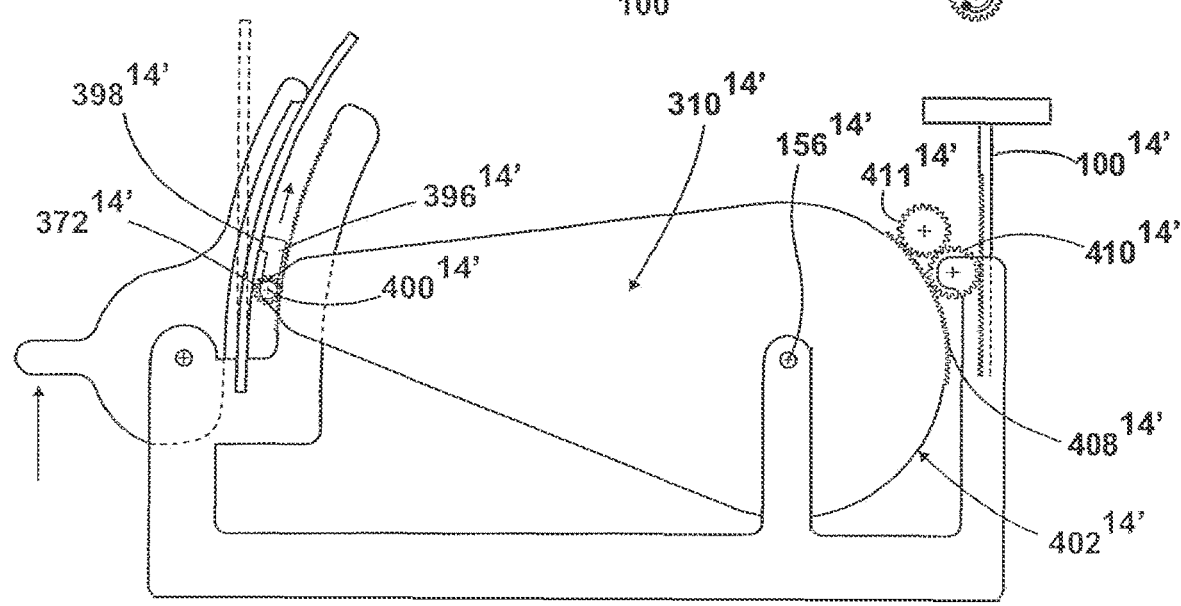

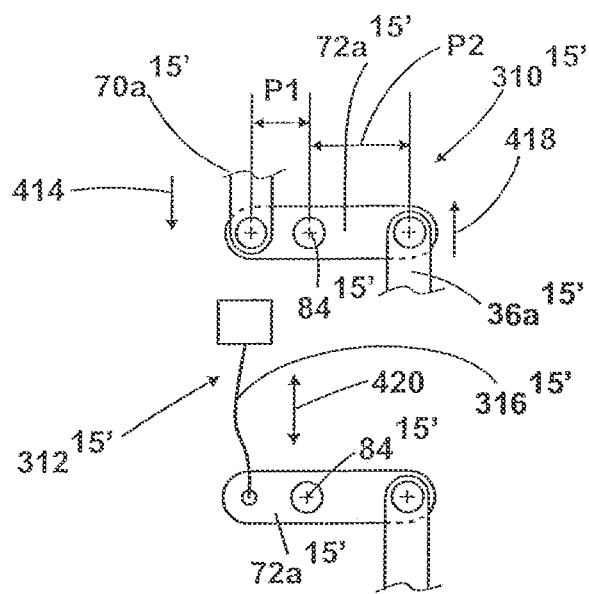
Fig. 35
Fig. 36
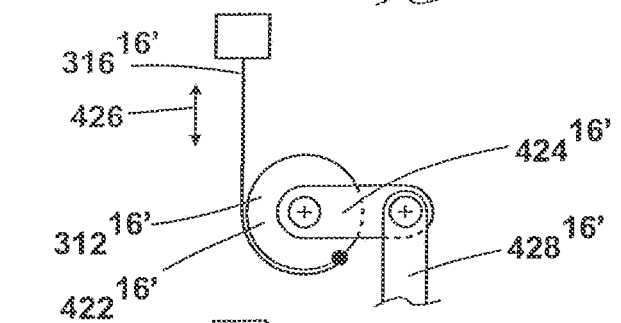
Fig. 37
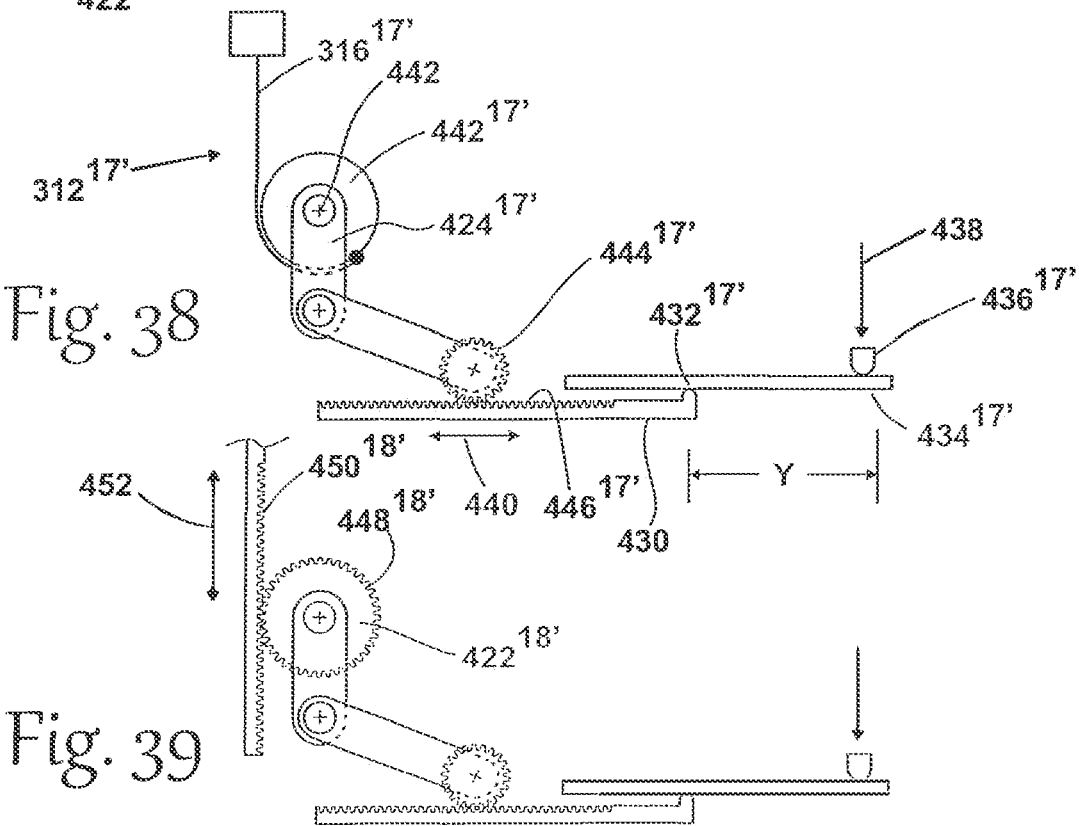
Fig. 38
Fig. 39

CHAIR INCLUDING A LEAF SPRING IN CONTACT WITH A LINKAGE TO PROVIDE RESISTANCE TO TILTING OF A BACKREST OF THE CHAIR

RELATED APPLICATIONS

This application is a continuation of: (i) U.S. patent application Ser. No. 18/348,596, filed on Jul. 7, 2023; (ii) U.S. patent application Ser. No. 18/348,564, filed on Jul. 7, 2023; and (iii) U.S. patent application Ser. No. 18/348,515 filed on Jul. 7, 2023. Each of U.S. patent application Ser. Nos. 18/348,596; 18/348,564; and 18/348,515 (identified as applications i, ii, and iii, respectively, in the preceding sentence) is a continuation of U.S. patent application Ser. No. 18/134,012, filed on Apr. 12, 2023 (now U.S. Pat. No. 11,744,374), which is a continuation of U.S. patent application Ser. No. 18/104,268, filed on Jan. 31, 2023 (now U.S. Pat. No. 11,744,373), which is a continuation of U.S. application Ser. No. 17/150,679, filed on Jan. 15, 2021, (now U.S. Pat. No. 11,596,235), which is a continuation-in-part of U.S. application Ser. No. 16/408,650, filed on May 10, 2019 (now U.S. Pat. No. 10,893,753), which is continuation of U.S. application Ser. No. 15/040,735, filed on Feb. 10, 2016 (now U.S. Pat. No. 10,292,498), which claims priority from Provisional App. No. 62/114,706. Each of these applications is hereby incorporated by reference in its respective entirety.

BACKGROUND OF THE INVENTION

Field of the Invention

This invention relates to apparatus upon which variable weight is applied during normal use and, more particularly, to an apparatus having at least one part with different adjusting characteristics during normal use depending upon the particular applied weight.

Background Art

A very significant percentage of furniture sold commercially has an ability to be adjusted/reconfigured to accommodate users with different body types and demands. As one example, task chairs are routinely engineered so that a single design can be offered with a substantial amount of versatility in terms of how it can be adapted to size and weight of different individuals so as to optimize function and comfort level.

In a typical task chair construction, a wheeled frame supports a vertically adjustable seat. A back rest is integrated into the frame and/or seat so that it can be tilted or reclined to accommodate a user's normal movements and/or to allow inclined back positions to be comfortably maintained by the user's upper torso weight as he/she is sitting. The task chairs may be made with or without armrests. When utilized, armrests are commonly made to be at least vertically adjustable to allow comfortable support for a user that may be different depending upon the particular user's build and/or the task(s) to be performed using the chair.

Reconfigurable designs are also commonly incorporated into seating used for leisure activities. Reading chairs and sectional pieces on modular furniture commonly have such an adjusting capability.

With a single design, performance of a particular seating apparatus will be different depending upon the weight of a user. For example, a heavier individual may be able to comfortably urge a back rest towards an inclined position and comfortably maintain potentially a number of different, desired, inclined positions within a range. On the other hand, a lighter individual with the same design may have to engage in a more unnatural movement and constantly exert a pressure on the seat back to prevent it from returning to its normal upright position, generally maintained through some sort of biasing mechanism.

Similar tilt features may be integrated into the seat itself with a user's weight affecting how the mechanisms will operate.

One industry solution to the above problem is to provide manual adjusting capabilities whereby biasing forces on movable components can be changed. For example, a mechanism has been incorporated that allows a user to change a spring force on a back rest to be more compatible with that user's weight.

Tilt and tension adjustment is typically achieved by rotating a knob or pulling a lever, which loads a spring. Once the chair is optimally adjusted, the user can recline to a comfortable backward distance. However, to optimize balance, the user must iteratively lean back and adjust. This process of adjusting tension and tilt by pulling a lever or turning a knob may require many rotations or pulls depending on the weight of the previous user, resulting in potentially wasted time and imperfect adjustments.

With the multitude of different manual adjusting capabilities currently in existing furniture designs, user operation is becoming more complicated. Even a basic task chair often has multiple actuators which a user is required to manually operate to customize a chair for his/her purposes. Oftentimes, such mechanisms are confusing to users who may default to simply using a chair in its current configuration, even if not optimally configured. This problem is aggravated when persons routinely move from chair to chair during a typical work day in certain office environments in which there are group meetings, training, collaboration at different locations, sharing of resources such as at computer stations, etc. This same sharing of chairs occurs in classrooms, libraries, open plan offices, etc.

The current demand for versatility may demand integration of adjusting mechanisms on even base line furniture. To control manufacturing costs, the quality of many of these mechanisms, and potentially the overall chair, may be compromised.

The challenges of providing customizable adjusting systems, while demonstrated in the chair environment above, is not so limited. Many different apparatus use adjusting components that rely on a certain balance that may be affected by a variable weight application encountered in normal use. As but one example, desktop mechanisms are now evolving which allow a user to elevate a work surface so that he/she has the option of either sitting or standing while working on a computer or performing other routine work day tasks. Ideally, a user has the ability to raise and lower the work surface in a range, and to maintain a desired position, without having to operate any locking or adjusting mechanisms. Given that different jobs require placement of different items on the work surface, the applied weight on the work surface may vary considerably, which makes a generic design difficult to practically construct.

These problems are contended with also in different environments and with different types of equipment outside of the furniture arena. In any environment wherein components are adjustable, designers strive to design systems so that they are affordable, reliable, and user friendly. Balancing these often competing objectives remains an ongoing challenge.

Scientists and medical researchers are more and more stressing the value of moving, even while sitting, while engaged in business and recreational activities. An optimally balanced state for a chair allows the user to recline freely, without resistance, and in a state of equilibrium, from upright to full recline. A properly balanced state also allows the user to stop at any position in between upright and full recline, which further encourages movement while sitting. When body force required to reconfigure a chair is not optimal—by reason of being too large or too small—a user's balance and comfort may be disrupted.

As noted above, manual adjustment of chairs to individual anatomy and weight may be difficult, by reason of: a) requiring awkward actuating parts movement; b) taking a substantial amount of time; and c) commonly requiring trial and error. As a result, many users that share chairs default to making no adjustment and occupy the chair without having the benefit of an appropriate adjustment. As a result, the user may be inadequately supported and in an ergonomically compromised position which may lead to discomfort, potential aches and injuries, and may encourage maintaining of a single position which, over extended periods, may have detrimental health consequences.

While automatic adjustment as described hereinabove has enormous benefits, it may be difficult and expensive to devise an overall structure that optimally adjusts to a wide range of weight as well as to differently proportioned body types that impart force on different components of a seating apparatus—including but not limited to seats, arm rests, back rest components, etc.—in a different manner.

SUMMARY OF THE INVENTION

In one form, the invention is directed to a reconfigurable apparatus for seating a user. The reconfigurable apparatus has a frame, a seat, a back rest component, and an adjusting assembly. The seat is mounted on the frame and movable relative to the frame between: a) a first position in which the seat resides with no user sitting on the seat, and b) a loaded position into which the seat moves from the first position as an incident of a user sitting on the seat. A user sitting on the seat can bear his/her back to produce a leaning force that changes an angular orientation of the back rest component relative to at least one of the seat and frame. The apparatus is configured so that a first leaning force is required to be applied to the back rest component to change the angular orientation of the back rest component from a starting angular position relative to the at least one of the seat and frame with no user sitting in the seat. The adjusting assembly is operable to change a resistance to changing of the angular orientation of the back rest component from the starting angular position. The adjusting assembly has a first subassembly and a second subassembly. The second subassembly is configured to be placed in different states. The first subassembly is configured so that with the second subassembly in a first state, the first subassembly increases the resistance to changing of the angular orientation of the back rest component from the starting orientation a predetermined amount in response to a first force being applied to the seat by a sitting user. The second subassembly is configured to be manually operable by a user to change the state of the second subassembly from the first state into a second state. The second subassembly is further configured so that with a user sitting and thereby applying the first force to the seat, the second subassembly in the second state causes the change in resistance to changing of the angular orientation of the back rest component from the starting position to be one of greater than or less than the predetermined amount.

In one form, the second subassembly acts between the back rest component and at least one of the frame and seat independently of the first subassembly.

In one form, the first and second subassemblies act between the back rest component and at least one of the frame and seat and share at least one component.

In one form, the second subassembly is operable to change the state of the second subassembly through a user force input on an actuator.

In one form, the second subassembly is operable to change the state of the second subassembly through a drive that is operable in response to a user input.

In one form, the second subassembly is configured to be changed from the first state into the second state after a user assumes a sitting position and is applying the first force to the seat.

In one form, the second subassembly is configured to be changed from the first state into the second state before the first force is applied to the seat through a user.

In one form, as an incident of the first force being applied to the seat with the second subassembly in the first state, a first component on the adjusting assembly which is guided in movement in a path, is caused to be moved along the path a first distance and in a first direction. As an incident of the second subassembly thereafter being changed from the first state into the second state, the first component is caused to one of: a) move further along the first path in the first direction; and b) move along the first path in a direction opposite to the first direction.

In one form, the resistance to changing of the angular orientation of the back rest component from the starting position is produced by at least one component. The at least one component has a part that is in turn movable against a resistance force to thereby allow the angular orientation of the back rest component to change from the starting orientation.

In one form, the part of the at least one component is movable against the resistance force by bending.

In one form, the part of the at least one component is movable against the resistance force by bending against a fulcrum.

In one form, as an incident of changing the second subassembly from the first state into the second state, a relationship between the at least one component and fulcrum is changed.

In one form, as an incident of the user sitting on the seat and applying the first force, a relationship between the at least one component and fulcrum is changed.

In one form, the at least one component has a portion fixed in relationship to one of the frame and seat.

In one form, the actuator has a knob that is manually turned around an axis to change the state of the second subassembly.

In one form, the actuator has a lever that is manually pivoted around an axis to change the state of the second subassembly.

In one form, the actuator has a component that is manually translated to change the state of the second subassembly.

In one form, the drive has a motor.

In one form, the seat has a peripheral edge. The second subassembly is operable through a user force input to an actuator located at the peripheral edge of the seat.

In one form, the at least one component is a leaf spring.

BRIEF DESCRIPTION OF THE DRAWINGS

FIG. 3 is a partially schematic representation of one specific form of adjusting assembly, integrated into the apparatus in FIGS. 1 and 2;

FIG. 4 is a fragmentary view of a part of the adjusting assembly in FIG. 3, which utilizes a leaf spring, and from a different perspective;

FIG. 5 is an enlarged, fragmentary view of a modified form of a leaf spring utilized on the apparatus in FIGS. 3 and 4;

FIG. 6 is an enlarged, fragmentary, elevation view of a linkage, modified from a corresponding linkage as used on the apparatus in FIGS. 3 and 4;

FIGS. 7-16 are partially schematic representations of apparatus incorporating different forms of adjusting assemblies, according to the invention;

FIG. 17 is a schematic representation of a further modified form of reconfigurable apparatus, according to the present invention;

FIG. 18 is a schematic representation of adjusting assemblies, according to the invention, acting between separate components on a frame;

FIG. 27 is a schematic representation showing a portion of an apparatus with one form of the inventive first and second subassemblies;

FIG. 28 is a sectional view of the apparatus taken along line 28-28 of FIG. 27;

FIG. 29 is a view as in FIG. 27 and showing portions removed/separated to identify details of the second subassembly;

FIG. 30 is a view as in FIGS. 28 and 29 and showing a modified form of apparatus;

FIG. 31 is a sectional view of the apparatus taken along line 31-31 of FIG. 30;

FIG. 32 is a schematic representation of a modified form of apparatus with a first form of subassembly according to the invention;

FIG. 33 is a view as in FIG. 32 of a slightly modified form of the apparatus with a second subassembly incorporated;

FIG. 34 is a view as in FIG. 33 with a different form of the second subassembly incorporated;

FIG. 35 is a fragmentary elevation view of a linkage as in FIG. 6;

FIG. 36 is a view as in FIG. 35 with a second subassembly incorporated;

FIG. 37 is a view as in FIGS. 35 and 36 with a different form of second subassembly incorporated;

FIG. 38 is a schematic representation of first and second subassemblies, according to the invention, and the second subassembly in the form in FIG. 37;

FIG. 39 is a view as in FIG. 38 with a modified form of the subassembly;

FIG. 40 is a partially schematic representation of a second subassembly, according to the present invention, with one form of manual actuator;

FIG. 41 is a view as in FIG. 40 with another form of actuator; and

FIG. 42 is a schematic representation of a part of a seat with another form of actuator shown schematically on a peripheral edge of the seat.

DETAILED DESCRIPTION OF THE PREFERRED EMBODIMENT

Figure 1:
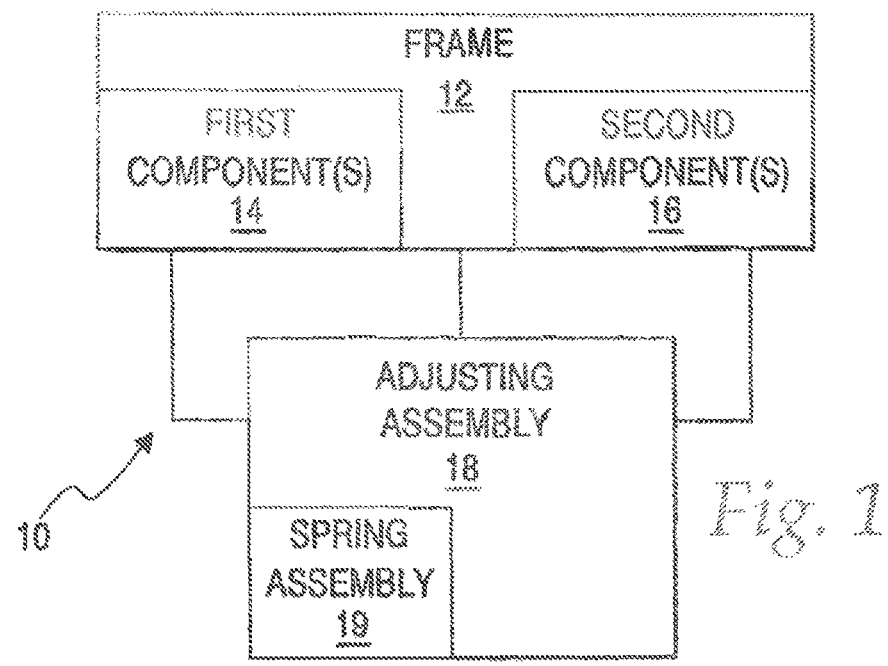
FIG. 1 is a schematic representation of a reconfigurable apparatus, according to the present invention.

In FIG. 1, a reconfigurable apparatus, according to the present invention, is shown in schematic form at 10. The apparatus 10 consists of a frame 12 and at least a first component 14 on the frame 12 upon which a force is applied in a first manner in using the apparatus 10 for its intended purpose.

At least a second component 16 is provided on the frame 12 and is movable relative to the at least first component and/or the frame 12. A force can be applied in a second manner upon the at least second component to reconfigure the apparatus 10 by moving the at least second component 16 relative to the at least first component and/or the frame 12.

An adjusting assembly 18 cooperates between the at least first component 14 and the at least second component 16 and is configured so that, as an incident of the force being applied in the first manner changing, the force applied in the second manner required to reconfigure the apparatus 10 changes.

The adjusting assembly 18 includes a spring assembly 19. The spring assembly 19 is configured to exert a force that resists movement of the at least second component 16 that varies as a magnitude of the force applied in the first manner varies.

The generic showing of the apparatus 10 is intended to encompass a wide range of different products and different applications. The inventive concepts can be used in virtually any system or apparatus wherein its normal intended use requires the application of a force on a first component and wherein that force on the first component impacts a force required to be applied to a second component to reconfigure the apparatus as contemplated during use.

While not intended to be limiting, the detailed description herein will be focused upon furniture and, more particularly, a chair construction. This application of the inventive concepts is intended to be exemplary in nature only and should not be viewed as limiting the inventive concepts to the specific type of apparatus described in detail herein. Further, the schematic showing in FIG. 1 is intended to encompass not only a wide range of different systems/apparatus, but different forms of components and their interaction for each such system/apparatus.

For example, interlocking toothed components are described, in exemplary forms below. The invention contemplates not only different types of toothed components, such as gears, differential gears, epicyclic gears, rack and pinion arrangements, etc., but also virtually an unlimited number of different interengaging components, such as sprockets and chains, pulleys and cables, mechanisms using levers, pistons, different types of linkages, etc.

Figure 2:
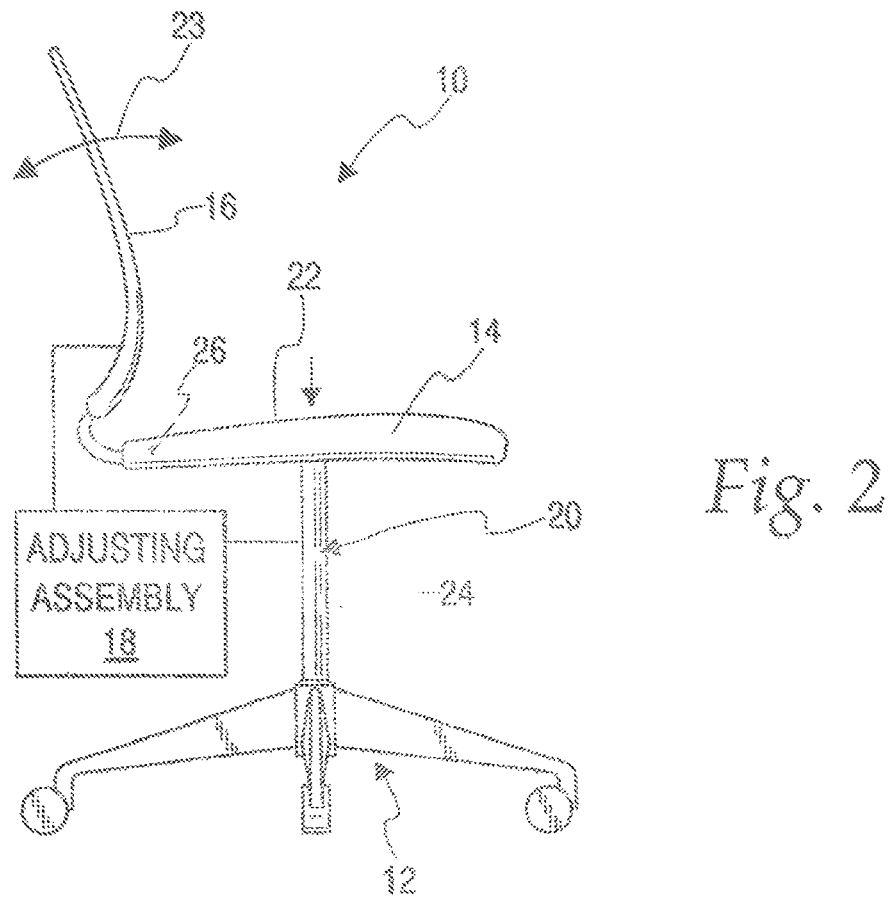
FIG. 2 is a side elevation view of a task chair, that is one representative form of apparatus as shown in FIG. 1, and incorporating an adjusting assembly according to the present invention.

In FIG. 2, one exemplary apparatus 10 is shown in the form of a task chair, in this case without armrests. Of course, armrests might be incorporated and might also have parts thereof movable in different manners depending upon the weight of the user, as hereinafter explained.

The chair 10 has a wheeled frame 12 with a vertically extending pedestal assembly 20. The first component 14 is in the form of a conventional-type seat with an upwardly facing user support surface 22. In this case, the aforementioned force applied in the first manner is the weight of the user exerted downwardly on the support surface 22 as he/she sits on the chair 10.

A corresponding second component 16 is in the form of a back rest against which a seated user leans to exert the aforementioned force in the second manner to reconfigure the chair 10. That is, the back rest moves relative to the frame 12 and first component 14, as the user leans back and forth while seated, generally in a manner as indicated by the double-headed arrow 23.

The adjusting assembly 18, as shown schematically in FIG. 2, acts between the first component/seat 14 and second component/back rest 16 directly and/or through the frame 12. The adjusting assembly 18 may be added to the frame 12 by attachment thereto, virtually anywhere thereon, or integrated thereinto, as by being constructed within a hollow 24 on the pedestal assembly 20.

The chair 10 may incorporate one or more adjusting features other than one that permits reconfiguration by changing the angle of the second component/back rest 16. The adjusting assembly 18 may be integrated into the mechanisms associated with these other features. Alternatively, the other features may operate without effect by the adjusting assembly 18.

For purposes of simplicity, the second component/back rest 16 will be shown as repositionable relative to the first component/seat 14 to reconfigure the chair 10 by movement of the second component/back rest 16 relative to the first component/seat 14 and frame 12 around a pivot axis 26. This particular connection should not be viewed as limiting.

Exemplary specific forms of the adjusting assembly 18 will now be described. As noted above, virtually an unlimited number of different variations of adjusting assembly are contemplated within the generic showing of FIGS. 1 and 2. These specific forms are exemplary in nature only. These particular mechanisms will also be described with respect to the apparatus in the form of a chair as shown in FIG. 2. Again, the particular nature of the apparatus is not limited to a chair or furniture, although it has particular applicability in this category of product.

In FIGS. 3 and 4, the first component/seat 14 (hereinafter referred to only as the representative chair "seat 14") is integrated into a support 28 that has a depending post 30 that is slidable guidingly vertically, as indicated by the double-headed arrow 32, in a guide channel 34 on the frame 12. A biasing assembly, shown in one exemplary form as a coil spring 33, normally biasably urges the seat 14 upwardly relative to the frame 12.

A generally U-shaped member 36 has one leg 38 of the "U" mounted on a frame part 40. The other leg 42 of the "U" has an offset bracing end 44.

For purposes of simplicity, the support 28 and member 36 can be considered to be part of the frame 12 and/or the adjusting assembly 18. Similarly, the component 58 can be considered to be part of the back rest 16 and/or the adjusting assembly 18.

The spring assembly 19 in this embodiment is in the form of a leaf spring. The leaf spring 19 has an elongate body 46 with a length L between spaced ends 48, 50, a width W, and a thickness T.

The leaf spring end 19 is anchored in the member 36 to project in cantilever fashion vertically upwardly therefrom. In this embodiment, the body 46 of the leaf spring 19 is preloaded so that it naturally assumes the dotted line shape and position.

The bracing end 44 of the member 36 is bifurcated, as seen in FIG. 4, with spaced edges 52 (one shown) at the extremity of the bracing end 44 engageable with one surface 54 of the leaf spring body 46 to maintain the body 46 in the straight vertical orientation, as shown in FIG. 3.

A part of the second component/back rest 16 (hereafter referred to only as the representative chair "back rest 16") is connected to the support 28 for movement relative thereto around the axis 26 as seen in FIG. 2. As a user situated on the seat 14 leans against the back rest 16, a force is generated as shown by the arrow 56 on the back rest component 58 that tends to pivot the component 58 in the direction of the arrow 60 around the axis 26.

The component 58 is configured so that an edge 61 on a cantilevered part 62 thereof bears against the leaf spring surface 54. In the depicted state, this produces a force upon the leaf spring body 46, at a location A along the length of the body 46, that tends to bend the body 46 in the direction of the arrow 64 around a fulcrum location at 66 where the body 46 projects away from the part of the member 36 in which it is anchored. The leaf spring 19 thus biasably resists movement of the component 58, and the back rest 16 of which the component 58 is a part, with a first force.

The configuration in FIG. 3, while it could show a starting state without any force application on the seat 14, is also representative of the overall state of the apparatus 10 with an individual of a first weight seated thereon. This is an equilibrium position for the chair 10 resulting from the balancing of the user's weight and the upward biasing force generated by the spring 33 acting between the frame 12 and the seat 14 through the support 28.

In the event that an individual of greater weight assumes a sitting position on the seat 14, the support 28 and component 58 will translate further downwardly against the force of the spring 33, which causes the edge 61 on the back rest component 58 to bear upon the leaf spring 19 at a location below the location A. As a result, a shorter moment arm is established between the location where the edge 61 on the part 62 contacts the surface 54 and the fulcrum location at 66. Thus, the leaf spring 19 has an effectively shorter length, whereby a greater force is required to be applied to the leaf spring 19 to effect bending thereof as would in turn allow movement of the back rest 16 to reconfigure the chair 10.

To stabilize the support 28, a depending arm 70 thereon connects to the frame part 40 through a link 72. One link end 74 moves about an axis 76 that is fixed relative to the frame part 40. The other link end 78 pivotally connects to the arm 70 for movement about an axis 80.

The bifurcated configuration of the leg 42 allows the part 62 on the component 58 to move in an opening 82 through the region at the offset bracing end 44 so that the member 36 does not interfere with the back rest component 58 as the back rest component 58 lowers under increasing user weight.

Accordingly, an increase in the weight of a user causes the leaf spring 19 to produce a greater resistance to movement of the back rest 16 relative to the frame 12. As a result, the chair is self-adjusting. The parts thereof can be engineered so that a desired relationship between the user's weight and the force required to move the back rest 16 are appropriately established.

In designing the chair 10 using a leaf spring component, the leaf spring body 46 may have a uniform cross-sectional shape as viewed orthogonally to its length. Alternatively, this shape may be non-uniform over at least a portion of its length. For example, as shown for a portion of the length of a modified form of body 46a, as shown in FIG. 5, the cross-sectional area varies progressively.

Tapering the cross-sectional area of the leaf spring over its length may allow further tuning of performance. Thickened regions may be provided to produce larger resistance forces for users at the higher weight end of the functional range.

The leaf spring material may be metal, plastic, a composite, etc. The leaf spring may be straight, curved, with changing cross-sectional shapes, etc. Changing shapes, pre-loading, changing dimensions, etc., are just examples of options that might be practiced to design and tune the adjusting assemblies so that they adapt more appropriately to users throughout a workable user weight range.

In a still further modified form of the structure in FIG. 3, as shown in FIG. 6, the link 72a, corresponding to the link 72, can be connected to the frame 12 for pivoting movement about an axis 84 between its ends 74a, 78a. Accordingly, as the arm 70a moves downwardly under increasing user weight, link 72a pivots around the axis 84 so that the member 36a simultaneously moves upwardly. Thus, for each incremental movement of the seat 14 downwardly, there is a greater movement of the edge 61 on the part 62 toward the fulcrum location 66 for the leaf spring 19 than occurs with the design in FIGS. 3 and 4.

In FIG. 7, a modified form of chair is shown at 10', with elements corresponding to those in FIGS. 3 and 4 identified with like reference numerals and a "'" designation.

The chair 10' has a back rest component 58' that acts against a leaf spring 19' that is anchored in a component 36'.

In this embodiment, the leaf spring body 46' is mounted at a slight angle a to vertical. Accordingly, the part 62' of the component 58' tends to bind more with the leaf spring 19' as it slides downwardly thereagainst under increasing user weight. This binding creates frictional forces that augment the upward balancing force produced by the spring 33'.

Additionally, the chair 10' utilizes cooperating toothed elements 86, 88, 90 that interact to cause movement of the frame part 40', arm 70' and leg 38' relative to each other and the frame part 40' that replicates the relative movement that occurs with corresponding elements in the embodiment shown in FIGS. 3 and 4. The toothed element 88 is in the form of a differential pinion that turns around an axis 92. Larger and smaller diameter toothed portions 94, 96, respectively, engage toothed racks 98, 100, respectively on the leg 38' and arm 70'. Turning of the toothed element 88 in the direction of the arrow 102 under increasing user weight causes simultaneous upward movement of the member 36' and downward movement of the support 28'.

In FIG. 8, a further modified form of chair, according to the present invention, is shown at 10". The chair 10" incorporates a back rest component 58" that interacts with a leaf spring 19" and leg 42" in the same way that the corresponding components interact on the chair 10 in FIGS. 3 and 4.

Further, the chair 10" incorporates toothed elements 86", 88", 90" which function essentially in the same manner as the corresponding components on the chair 10' in FIG. 7. The primary difference between these embodiments is that the leg 38" has a curved shape that moves in a complementarily-curved channel 104 on the frame part 40"'. Whereas the support 28' associated with the seat 14 and member 36' move relative to each other in parallel, straight paths, the member 36" moves in a curved path, as dictated by the curvature of the leg 38" and cooperating channel 104. This curvature nominally matches the curved shape of the leaf spring 19" which is pre-loaded from the dotted line position to the operative, solid line position in FIG. 8. Accordingly, the relative movement of the member 36" and support 28" causes the part 62" that engages the leaf spring 19" to generally follow the pre-loaded curvature of the leaf spring 19".

In a further modified form of chair, as shown at 10''' in FIG. 9, the basic construction of FIGS. 3 and 7 is utilized with the exception that the leaf spring 19''' is fixedly mounted to the component 58''' and acts against the member 36''', i.e., this component arrangement is reversed from that in the earlier embodiments. The leaf spring 19''' is pre-loaded from the dotted line position into the solid line position which is maintained by the abutment thereof to the member 36'''.

In FIGS. 10 and 11, a further modified form of chair, according to the invention, is shown at $10^{4'}$. In this embodiment, multiple leaf springs $19a^{4'}$, $19b^{4'}$, $19c^{4'}$, $19d^{4'}$ are utilized, each with an end anchored in a block 105.

In this embodiment, the post $30^{4'}$ has a toothed rack $100^{4'}$ that cooperates with a toothed, differential pinion element $88^{4'}$, that cooperates in turn with a toothed rack $98^{4'}$ making up part of a toothed element $86^{4'}$ on a member 364'.

Downward movement of the post $30^{4'}$ under the weight applied to the seat 14 causes the toothed rack $100^{4'}$ and toothed element $88^{4'}$, and separately the toothed elements 884'. $86^{4'}$, to interact to translate the member $36^{4'}$ in the direction of the arrow 106.

As the weight on the seat 14 is increased, the member $36^{4'}$ will move continuously in the direction of the arrow 106 to successively engage free ends of angled extensions 108a, 108b, 108c at the ends of leaf springs $19a^{4'}$, $19b^{4'}$, $19c^{4'}$, successively. The extensions 108a, 108b, 108c and one surface 110 on the leaf spring $19d^{4'}$ reside in a reference plane P. As user applied weight increases, a surface 112 on the member $36^{4'}$ moves along this plane P to successively engage the extensions 108a, 108b, 108c and eventually the surface 110, whereby the surface 112 defines separate fulcrum locations, corresponding to the fulcrum location 66, for the free ends of the leaf springs $19a^{4'}$, $19b^{4'}$, $19c^{4'}$, $19d4'$. In other words, the leaf springs $19a^{4'}$, $19b^{4'}$, $19c^{4'}$, $19d^{4'}$ are successively operatively engaged under increasing user weight. As a result, the resistance force to the applied leaning force on the back rest 18 in the direction of the arrow 114 is generated by some or all of the leaf springs $19a^{4'}$, $19b^{4'}$, $19c^{4'}$, $19d^{4'}$ as they are borne against the surface 112 under the user leaning force.

It is important to point out that the rack and pinion components are not restricted to any specific orientation. The cooperating rack and pinion components may be oriented in virtually any orientation that can be adapted to cause movement of the associated parts in the same manner.

Further, one or all of the leaf springs $19a^{4'}$, $19b^{4'}$, $19c^{4'}$, $19d^{4'}$ could be pre-loaded or in curved tracks.

In an alternative form of the basic structure in FIGS. 10 and 11, as shown for the chair $10^{5'}$ in FIGS. 12 and 13, the member $36^{5'}$ vertically advanced, or advanced in another direction, is caused to interact with some, or all, of a plurality, and in this case three, leaf springs $19a^{5'}$, $19b^{5'}$, $19c^{5'}$, which are arranged to be substantially coplanar, as opposed to stacked as the leaf springs $19a^{4'}$, $191D^{4'}$, $19c^{4'}$, $19d^{4'}$ are on the chair 104'.

Under an increasing user weight on the seat 14, a surface $112^{5'}$ on the member $36^{5'}$ engages successively against surfaces $116a^{5'}$, $116b^{5'}$, $116c5'$. As shown in FIG. 12, the particular exemplary weight causes engagement of the surface $112^{5'}$ with only two of the leaf springs $19a^{5'}$, $19b^{5'}$.

The leaning force on the back rest 18 is applied on an actuator 118 in a direction into the page, as indicated by the "X" at 120. Resistance to the leaning force is generated in the same manner for the chair $10^{5'}$ as for the chair $10^{4'}$ but with the different arrangement of leaf springs.

In an alternative form, each of the leaf springs in FIGS. 12 and 13 might be substituted for by coil springs, compression/tension springs, or a torsion rod of the type described in an additional embodiment below. One or more springs might be utilized. More springs allow for finer control. Each spring can be individually tuned.

Figure 14:
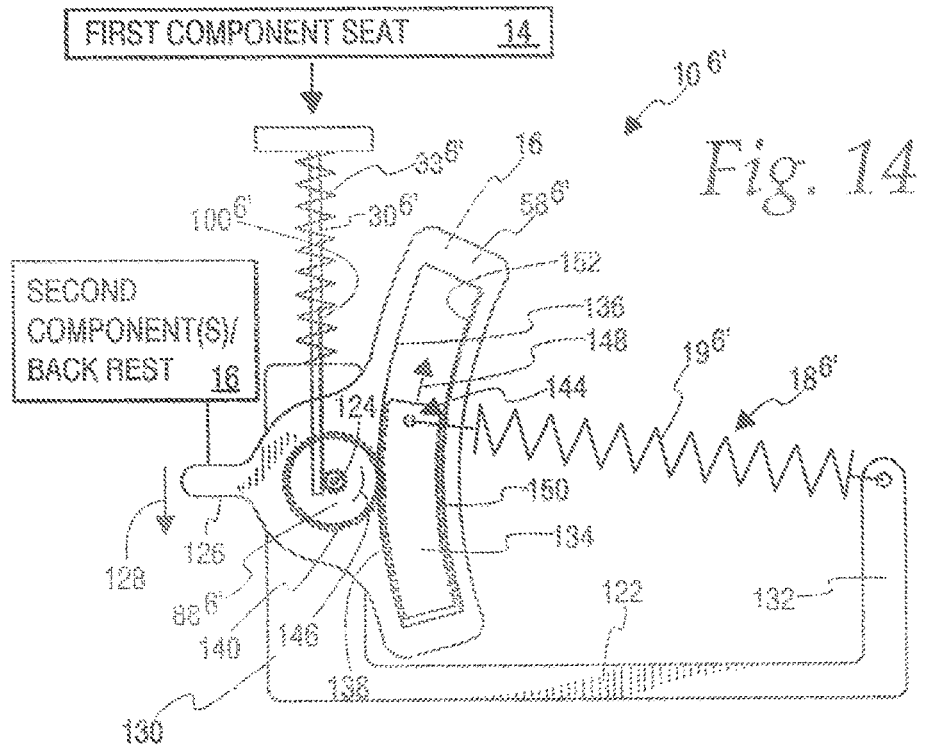

In FIG. 14, a further modified form of chair, according to the invention, is shown at $10^{6'}$. A post $30^{6'}$ has a toothed rack $100^{6'}$ that cooperates with a differential pinion/toothed element $88^{6'}$. The toothed element $88^{6'}$ moves together with a component $58^{6'}$ that is part of the back rest 16 or otherwise moves in response to movement thereof. The component $58^{6'}$ is mounted for pivoting movement relative to a frame part 122 around an axis 124 as the post $30^{6'}$ raises and lowers as different weight forces are applied to and removed from the seat 14.

The leaning force on the back rest 16 is applied to an arm 126 on the component $58^{6'}$ in the direction of the arrow 128.

The frame part 122 has a "U" shape with spaced legs 130, 132. The component $58^{6'}$ is mounted on the leg 130.

The toothed element $88^{6'}$ cooperates with a separate toothed element 134 that moves guidingly in a channel 136 on the component $58^{6'}$. In this embodiment, the toothed element 134 and cooperating channel 136 have a curved shape so that the toothed element 134 is movable guidingly in an arcuate path. A row of teeth 138 on one side of the toothed element 134 engage teeth 140 on the toothed element $88^{6'}$ so that the toothed element 134 moves back and forth within the channel 136 as the toothed element $88^{6'}$ is rotated in opposite directions around its axis 124.

The adjusting assembly $18^{6'}$ in this embodiment consists of an elongate spring assembly $19^{6'}$, in this particular embodiment shown as a coil spring under tension. The spring $19^{6'}$ is connected between an end location at 144 on the toothed element 134 and the leg 132 on the frame part 122.

As a user sits on the seat 14, without leaning against the back rest 16, the post $30^{6'}$ moves against the force of the spring $33^{6'}$ downwardly, thereby turning the toothed element $88^{6'}$ in the direction of the arrow 146, which causes the toothed element 134 to move in the direction of the arrow 148 in the channel 136. The precise position of the toothed element 134 in the channel 136 is dictated by the weight of the user.

Once the user is seated and leans back against the back rest 16, separate teeth 150, 152, on the toothed element 134 and component $58^{6'}$, within the channel 136, engage, thereby to fix the position of the toothed element 134 within the channel 136.

Under an applied leaning force in the direction of the arrow 128 on the arm 126, the component $58^{6'}$, and the associated back rest 16, tend to pivot around the axis 124, which is resisted by the force in the spring 142. Because the distance between the axis 124 and end location 144 where the resistant spring force is applied is increased with increasing weight of a user, the resistant force generated by the coil spring $19^{6'}$ is likewise increased.

Figure 15:
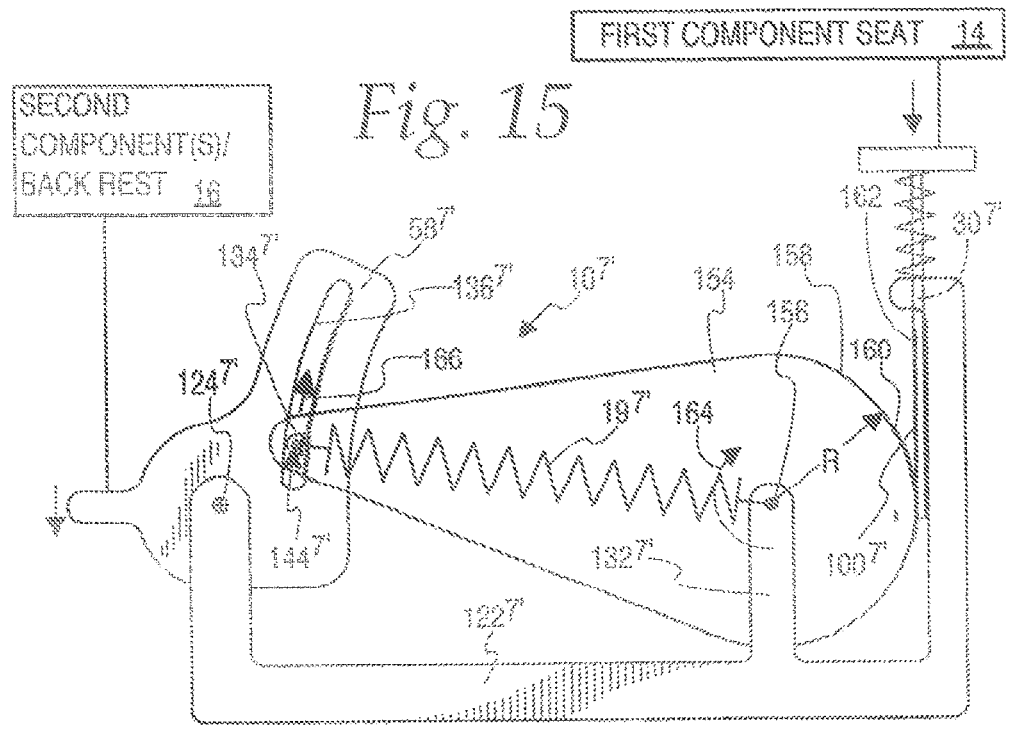

The chair $10^{7'}$ in FIG. 15 operates on the same basic principles as the chair $10^{6'}$ in FIG. 14.

More particularly, a toothed element $134^{7'}$ moves in a channel $136^{7'}$ having an arcuate shape. A coil spring $19^{7'}$ connects between the toothed element $134^{7'}$ and a leg $132^{7'}$ on a U-shaped frame part $122^{7'}$.

The primary difference between the structure in FIG. 15, compared to that in FIG. 14, is that the toothed element $134^{7'}$ is part of, and moves with, an elongate component 154 that is pivoted about an axis 156 that is the approximate location at which the spring $19^{7'}$ connects to the leg $132^{7'}$. The component 154 has a curved edge 158 with a constant radius R centered on the axis 156. That edge 158 has teeth 160 which mesh with teeth 162 on a post $30^{7'}$ that has a toothed rack $100^{6'}$ where the teeth 162 are located.

Increased weight of a user on the seat 14 pivots the component 154 in the direction of the arrow 164 around the axis 156 to move the toothed element $134^{7'}$ in the direction of the arrow 166 in the channel $136^{7'}$. In so doing, the distance between the spring mount location at $144^{7'}$ on the toothed element $134^{7'}$ and the pivot axis $124^{7'}$ for the component $58^{7'}$ increases, thereby to cause an increase in the resistance to tilting of the back rest 16 in the same manner as occurs with the chair $10^{6'}$.

In FIG. 16, a further modified form of chair is shown at $10^{8'}$ wherein the spring assembly $19^{8'}$ includes an elongate torsion component 168 with a lengthwise axis 170. The adjusting assembly $18^{8'}$ further includes an actuating component 172 that has a portion 174 keyed to the periphery of the torsion component 168 to move slidingly axially therealong in the same angular orientation. With the torsion component 168 fixed in relationship to the frame $12^{8'}$, a user's weight on the seat 14 causes movement of the actuating component 172 through cooperation between a toothed rack 176 thereon and intermediate input structure 178 of suitable construction. Increased weight on the seat 14 causes the actuating component 172 to shift closer to a base 180 of the torsion component 168 closer to where it is anchored to the frame $12^{8'}$.

A leaning force on the back rest 16 is applied to the torsion component generally in the direction of the arrow 182, tending to turn the torsion component 168 around the axis 170. For the back rest 16 to reposition, the torsion component 168 must be twisted around the axis 170. This twisting action is resisted to a greater degree with the actuating component 172 closer to the base 180 under a heavier user weight.

On the other hand, with the actuating component 172 shifted towards its free end 184, as occurs with a lighter user, the torsion component 168 can be more readily twisted about its length and the axis 170.

In FIG. 17, a still further modified form of chair, according to the invention, is shown at $10^{9'}$ with an adjusting assembly $18^{9'}$ cooperating between a seat 14 and back rest 16. A spring assembly $19^{9'}$ is mounted to a frame $12^{9'}$ and consists of separate leaf springs with bodies $46^{9'}$ each with spaced ends supported by blocks 186, 188 on the frame $12^{9'}$. With this arrangement, the bodies $46^{9'}$ and blocks 186, 188 cooperatively extend around an opening 190 with a width W.

An elongate, wedge-shaped actuating component 192 with a uniform width W1, slightly less than the width W, extends through the opening 190.

A toothed rack 194 is provided on the actuating component 192 and moves therewith. In response to a weight force being applied to the seat 14, and through an appropriate force transfer structure 196, the toothed rack 194 and actuating component 192 are shifted in the direction of the arrow 198.

By reason of the wedge shape, the actuating component 192 has oppositely facing actuating surfaces S1, S2, each with one dimension D1 at one end and a larger dimension D2 at its opposite end, that abut to, or reside adjacent to, facing surfaces S3, S4, respectively, on the bodies $46^{9'}$. As the actuating component 192 shifts in the direction of the arrow 198, a progressively larger area of the surfaces S1, S2 confronts the leaf spring bodies $46^{9'}$.

The back rest 16 imparts a force to the actuating component 192 through a suitable force transfer structure at 202 tending to turn the actuating component 192 around an axis 204.

Accordingly, a user leaning force generates a force on the actuating component 192 that bears the surfaces S1, S2 simultaneously against the surfaces S3, S4 of the leaf spring bodies $46^{9'}$ between the spaced supported ends. The larger the area of the surfaces S1, S2 in contact with the bodies $46^{9'}$, the more resistant the bodies $46^{9'}$ are to deformation. This translates into a greater resistance to the repositioning of the back rest 16 for a larger weight application on the seat 14.

Further, as the actuating component 192 turns around the axis 204, the force transfer between the actuating component 192 and bodies $46^{9'}$ occurs primarily at corners C1, C2, C3, C4 of the actuating component 192, which bear against reinforced and thus more rigid parts of the bodies $46^{9'}$ adjacent to the blocks 186, 188 as more user weight is applied. Thus, greater resistance to back rest movement results.

In a still further alternative form, as shown in FIG. 18, multiple adjusting assemblies 18 are utilized between a cooperating first component(s)/seat 14 and second component(s)/back rest 16 on a frame 12.

Ideally, the apparatus/chair 10 will adapt to users weighing as much as 350 pounds, or more. While one spring assembly might be designed for a total desired weight range to be accommodated, two or more spring assemblies might be utilized and their function and operation coordinated.

Further, different spring assemblies might be utilized with coordinated operation. For example, one spring assembly may cover a range of 30-175 pounds with a second spring assembly operational for user weights in the range of 175-350 pounds. More springs/spring assemblies might be added to further split up the weight ranges.

The spring assemblies may be designed in relationship to seat movement. For example, one spring assembly may be operational for 0-0.5" of seat movement with a separate spring assembly operational for seat movement of 0.5"-1", where 1" is the seat movement for the maximum weight for which the apparatus is designed.

The examples herein of spring assembly/spring construction should not be viewed as limiting. Different spring types and combinations are contemplated. For example, the springs may be curved, coiled with different turn diameter and rise, hybrid shapes, concentric arrangements, etc. Coil springs, or the like, may produce forces under either compression or tension.

Figures 19, 20:
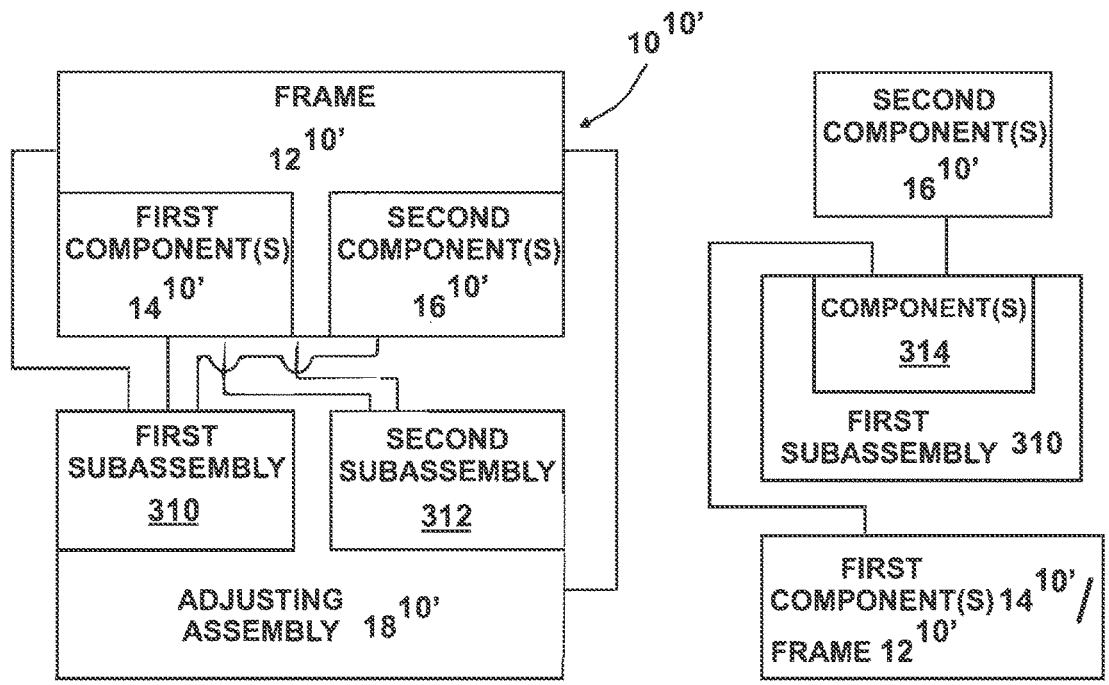
FIG. 19 is a schematic representation of a modified form of apparatus, according to the present invention, and including an adjusting assembly with separate first and second subassemblies.
FIG. 20 is a schematic representation of the first subassembly in FIG. 19 in a form that is operable independently of the second subassembly.

In FIG. 19, another form of the inventive apparatus is shown at $10^{10'}$ consisting of a frame $12^{10'}$ and at least a first component $14^{10'}$ on the frame $12^{10'}$ upon which a force is applied in a first manner in using the apparatus $10^{10'}$ for its intended purpose.

At least a second component $16^{10'}$ is provided on the frame $12^{10'}$ and is movable relative to the at least first component $14^{10'}$ and/or the frame $12^{10'}$. A force can be applied in a second manner upon the at least second component $16^{10'}$ to reconfigure the apparatus $10^{10'}$ by moving the at least second component $16^{10'}$ relative to the at least first component $14^{10'}$ and/or the frame $12^{10'}$.

An adjusting assembly $18^{10'}$ is provided to cooperate between the frame $12^{10'}$, first component(s) $14^{10'}$, and second component(s) $16^{10'}$, potentially in different manners.

The adjusting assembly $18^{10'}$ in turn consists of a first subassembly 310 and a second subassembly 312. The first and second subassemblies 310, 312 are usable independently or cooperatively to thereby change a resistance to movement of the second component(s) $16^{10'}$ relative to the first component(s) $14^{10'}$ and/or frame $12^{10'}$. The first and second subassemblies 310, 312 may cooperate between any of the frame $12^{10'}$, first component(s) $14^{10'}$, and second component(s) $16^{10'}$ in any combination and in different manners.

In one form, as shown in FIG. 20, the first subassembly 310 cooperates between the second component(s) $16^{10'}$ and first component(s) $14^{10'}$/frame $12^{10'}$ through at least one component 314 independently of the second subassembly 312.

Figures 21, 22:
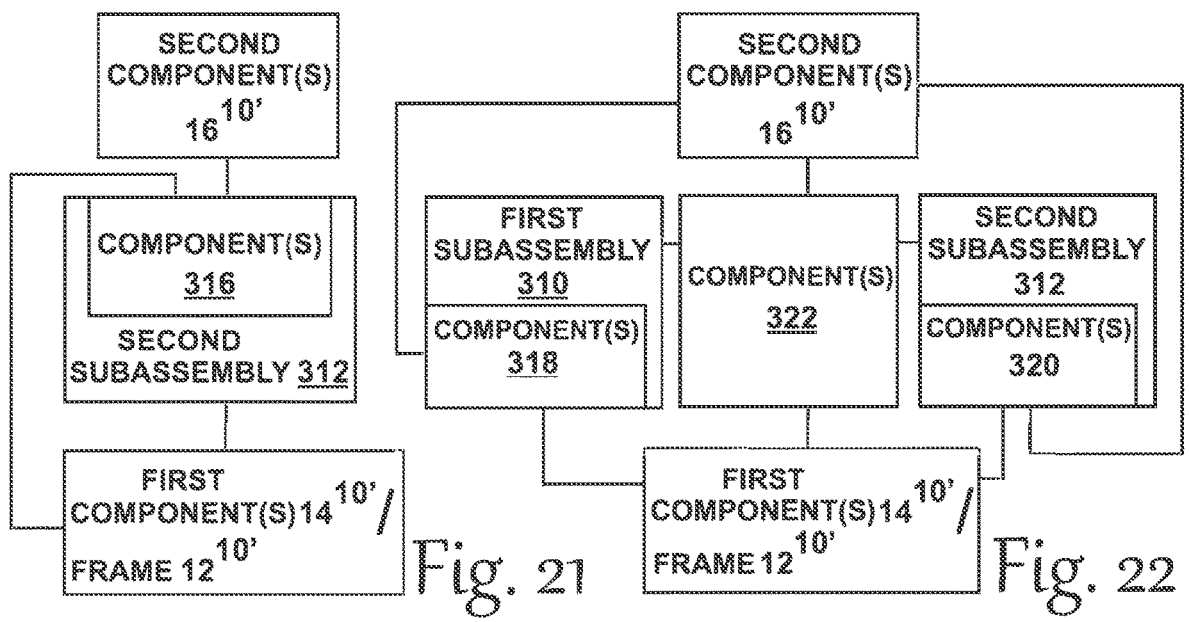
FIG. 21 is a schematic representation of a form of the second subassembly in FIG. 19 that is operable independently of the first subassembly therein.
FIG. 22 is a schematic representation of one form of the first and second subassemblies in FIG. 19 that share at least one component.

Similarly, as shown in FIG. 21, the second subassembly 312 may cooperate between the second component(s) $16^{10'}$ and the first component(s) $14^{10'}$/frame $12^{10'}$ through one or more components 316 independently of the first subassembly 310.

Alternatively, as shown in FIG. 22, the first subassembly 310 and second subassembly 312 cooperate between the second component(s) $16^{10'}$ and the first component(s) $14^{10'}$/frame $12^{10'}$ through one or more components 318, 320, respectively on the first subassembly 310 and second subassembly 312, and further share at least one component 322.

Figure 23:
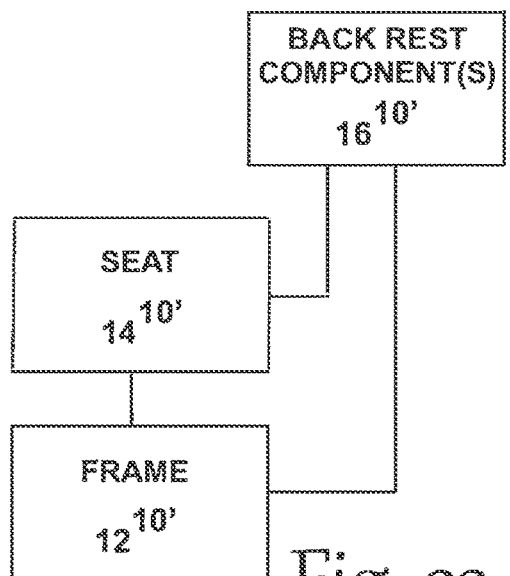
FIG. 23 is a schematic representation of one form of the apparatus in FIG. 19 used for sitting.

While the apparatus $10^{10'}$ is not so limited, it will be described hereinbelow using an exemplary seating apparatus/chair construction, as shown schematically in FIG. 23, wherein the first component(s) is in the form of a seat $14^{10'}$ on the frame $12^{10'}$ with the second component(s) consisting of a back rest component $16^{10'}$ that is mounted to the seat $14^{10'}$ and/or frame $12^{10'}$ to be movable relative thereto.

It should be understood that the backrest $16^{10'}$ may be made of a single component or multiple independently movable or cooperating parts that might be adjusted together or independently through the adjusting assembly $18^{10'}$. For purposes of simplicity, a representative single back rest component $16^{10'}$ will be described hereinbelow.

The reconfigurable apparatus/chair $10^{10'}$, without limitation, may have the same basic construction as any of the apparatus/chairs $10$-$10^{9'}$, as described above.

The first subassembly 310 corresponds generally to the adjusting assembly $18$-$18^{9'}$, as shown in each of FIGS. 1-17. The first subassembly 310 operates principally, or exclusively, in response to movement of the seat $14^{10'}$ between: a) a first position in which the seat $14^{10'}$ resides with no user sitting on the seat $14^{10'}$; and b) a loaded position into which the seat $14^{10'}$ moves from the first position as the incident of the user sitting on the seat $14^{10'}$, to thereby change a resistance to changing of the angular orientation of the back rest component $16^{10'}$ from a starting angular position a predetermined amount, related to user weight.

The second subassembly 312 is configured to be manually operable by a user to change its state.

With the second subassembly 312 in a first state and no user sitting in the seat $14^{10'}$ a first leaning force is required to be applied to the back rest component $16^{10'}$ to change the angular orientation of the back rest component $16^{10'}$ from a starting angular position relative to the at least one of the seat $14^{10'}$ and frame $12^{10'}$.

With the second subassembly 312 in the first state, a user sitting on the seat $14^{10'}$ applies a first force to the seat $14^{10'}$ whereupon the resistance to changing of the angular orientation of the back rest component $16^{10'}$ from the starting orientation increases a predetermined amount, related to a user's weight.

By manually changing the second subassembly 312 from a first state into a second state, upon a user sitting and applying the first force to the seat, the second subassembly 312 causes the resistance to changing of the angular orientation of the back rest component $16^{10'}$ such that with a user sitting in the seat $14^{10'}$ and applying the first force, the second subassembly 312 in the second state causes the resistance to changing of the angular orientation of the back rest component $16^{10'}$ from the starting position to be one of greater than or less than the predetermined amount added to the final leaning force.

Figure 24:
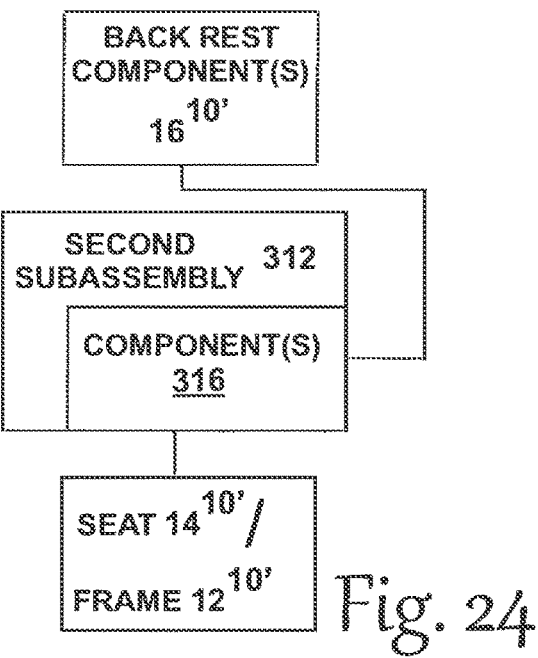
FIG. 24 is a schematic representation of additional details on the apparatus in FIG. 23.

As shown in FIG. 24, the components 316 on the second subassembly 312 that act between the back rest component(s) $16^{10'}$ and seat $14^{10'}$/frame $12^{10'}$ may pre-apply a force that resists changing of the angular orientation of the back rest component $16^{10'}$ or may increase resistance in response to a leaning force being applied to the back rest component(s) $16^{10'}$. By changing the second subassembly 312 from its first state into its second state the pre-applied force may changed or the responsive resistance force may be changed.

In one preferred form, the first force generated by the user assuming the sitting position effects a gross change in the resistance to changing of the angular orientation of the back rest component $16^{10'}$ whereas the manual input may be provided for a smaller range of resistance adjustment, which may be considered more as "fine tuning".

Figure 25:
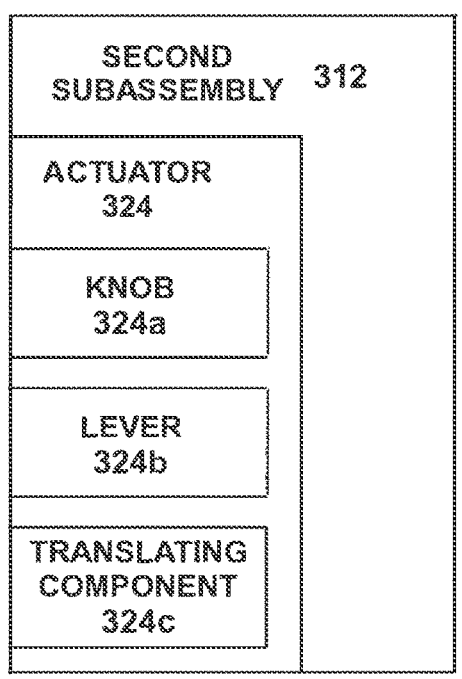
FIG. 25 is a schematic representation of different actuators for manual operation of the second subassembly.

As shown in FIG. 25, the second subassembly 312 has an actuator 324 that is manually operable to change the state of the second subassembly 312. Within the generic showing of the actuator 324 in FIG. 25 are different forms including, without limitation, a knob 324a that is manually turned around an axis, a lever 324b that is manually pivoted around an axis, and a component 324c that is manually translated to change the state of the second subassembly. The actuators 324a, 324b, 324c each requires a manual force input by the user.

Figure 26:
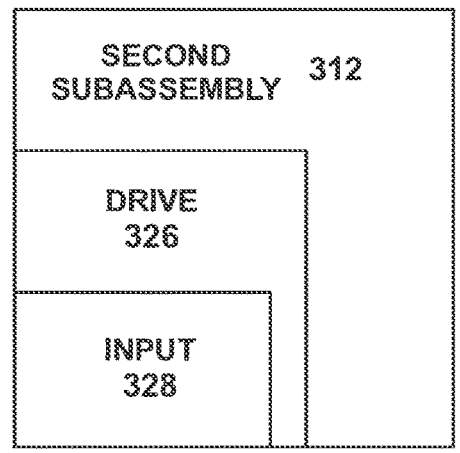
FIG. 26 is a schematic representation of another form of actuator for the second subassembly.

Alternatively, as shown in FIG. 26, the second subassembly 312 may have an associated powered drive 326 responsive to manually operation of an input 328. The drive 326 may be a motor, or the like.

The second subassembly 312 is configured to be changed from its first state into a second state either before or after a user assumes a sitting position and is applying the first force to the seat $14^{10'}$.

The change in resistance to changing of the angular orientation of the back rest component(s) $16^{10'}$ can be generated, without limitation, by incorporating the manually operable second subassembly 312 into any of the structures described above. In virtually all of the previously described constructions, the second subassembly 312, in the FIG. 22 form, can be incorporated to coordinate its operation with the first subassembly 310. Generally, the first subassembly 310, corresponding to the adjusting assembly $18\text{-}18^{9'}$ in FIGS. 1-17, moves one or more components in controlled/predetermined paths as an incident of the user applying the first force by sitting on the seat $14^{10'}$. The second subassembly 312 may reverse or extend the amount of movement of one or more of such components. This construction should not be viewed as limiting.

Examples of coordinated operation of the second subassembly 312 with adjusting assemblies in exemplary embodiments from FIGS. 1-17 will now be described, with it being understood that with the present teachings in hand, one skilled in the art could utilize the inventive concepts described herein to incorporate a second subassembly 312 into many other different forms of apparatus to coordinate movement with a corresponding adjusting assembly/first subassembly.

In FIGS. 27-29, the first subassembly $310^{11'}$ operates in certain respects similarly to the corresponding structure in FIG. 10. The first force generated by the user's weight is applied in the direction of the arrow 330, thereby causing a post 30" with a toothed rack $100^{11'}$ to be moved downwardly against a force generated by a spring $33^{11'}$ acting as against a part of the frame $12^{11'}$. The toothed rack $100^{11'}$ cooperates with a differential pinion element $88^{11'}$ which in turn cooperates with a toothed rack $98^{11'}$. The differential pinion element $88^{11'}$ produces a differential movement of associated components as a result of the difference between the radial dimensions D1 and D2, whereby movement of the member $36^{11'}$ in the direction of the arrow 334 is greater than the movement of the post $30^{11'}$ transversely in the direction of the arrow 330, that initiates movement of the overall mechanism.

The member $36^{11'}$ has an upward projection defining a fulcrum at $338^{11'}$. A leaf spring $340^{11'}$ has one end $342^{11'}$ anchored in the frame $12^{11'}$ and cantilevers away therefrom to a free end adjacent to which a component $344^{11'}$ bears such that a force in the direction of the arrow 346 exerted upon the back rest component $16^{11'}$, and applied to the leaf spring $340^{11'}$ by the component $344^{11}$: is resisted by the stiffness of the leaf spring. In other words, the angular repositioning of the back rest component $16^{11'}$ occurs by bending the leaf spring $340^{11'}$ against the fulcrum $338^{11'}$.

As noted above, through the first subassembly $310^{11'}$, the weight of the user will cause location of the fulcrum 338 to be at a predetermined position along the cantilevered length of the leaf spring 340".

In this embodiment, the aforementioned components correspond to the components 322 shown in FIG. 22.

The second subassembly $312^{11'}$, as shown in FIG. 28, consists of the component $316^{11'}$ that is wrapped against the pinion element $88^{11'}$ such that by being manually moved through an actuator 324, the component $316^{11'}$ can be moved in opposite directions, as indicated by the double-headed arrow 350, which causes the pinion element $88^{11'}$ to be moved in opposite directions around its axis $352^{11'}$. This shifts the fulcrum 338 incrementally in distances in opposite directions, indicated by the double-headed arrow 354.

The exemplary component $316^{11'}$ may be an inner core component such as part of a Bowden cable having its end wrapped around a cylindrical portion $356^{11'}$ of the pinion element $88^{11'}$ and anchored thereto at $358^{11'}$.

FIGS. 30 and 31 show a structure corresponding to that in FIGS. 27-29 with the primary exception being that spaced leaf springs $340a^{12'}$, $340b^{12'}$ are cantilever mounted to the frame $12^{12'}$ in spaced relationship, each cooperating with a fulcrum $338a^{12'}$, $338b^{12'}$.

Further, members $36a^{12'}$, $36b^{12'}$ defining the fulcrums $338a^{12'}$, $338b^{12'}$ are curved at bottom sides $360a^{12'}$, $360b^{12'}$ to be guided in a slightly curved path against a complementarily-shaped guide surface $362^{12'}$ on the frame $12^{12'}$.

The curvature of the surface $362^{12'}$ nominally matches the bent shape of the loaded leaf springs $340a^{12'}$, $340b^{12'}$ therebetween with a substantially constant width W within which the free ends $366a^{12'}$, $366b^{12'}$ of the members $36a^{12'}$, $36b^{12'}$ defining the fulcrums $338a^{12'}$, $338b^{12'}$ are guided.

The second subassembly $312^{12'}$, as shown separated in FIG. 30, corresponds substantially to the second subassembly $312^{11'}$ in cooperating with the pinion element $88^{12'}$.

In FIG. 32 a first subassembly $310^{13'}$ is shown with some components similar to those in FIG. 15. A component $154^{13'}$ pivots about an axis $156^{13'}$. Under the user's weight on the seat $14^{13'}$, a toothed rack $100^{13'}$ is moved in the direction of the arrow 368, which pivots the component $154^{13'}$ in the direction of the arrow 370 around the axis $156^{13'}$. This causes a pinion gear $372^{13'}$ to move within a curved passageway $374^{13'}$ defined between a leaf spring $376^{13'}$ loaded into the bent solid line shape, and the complementarily-shaped toothed edge $378^{13'}$ in mesh with the pinion gear $372^{13'}$.

A lever component $58^{13'}$ is pivotably mounted to the base $380^{13'}$, on which the component $154^{13'}$ is mounted, for pivoting movement around an axis $382^{13'}$.

One cantilevered arm $384^{13'}$ on the component $58^{12'}$ defines a bearing edge $386^{13'}$ that acts against a surface $388^{13'}$ on the leaf spring $376^{13'}$ facing oppositely to a surface on the leaf spring $376^{13'}$ bounding the passageway $374^{13'}$.

A force on the back rest component $16^{13'}$, tending to change the angular orientation of the back rest component $16^{13'}$, is imparted to a cantilevered arm $390^{13'}$ on the component $58^{13'}$ which causes a bending force to be imparted by the edge $386^{13'}$ on the leaf spring $376^{13'}$.

An end $392^{13'}$ on the component $154^{13'}$ defines a fulcrum for the leaf spring $376^{13'}$, the end of which is anchored in the base $380^{13'}$. As the weight of the user increases, the fulcrum $392^{13'}$ advances in the direction of the arrow 394, which shortens the moment arm between fulcrum $392^{13'}$ and the edge $386^{13'}$, thereby creating greater resistance to angular reorientation of the back rest component $16^{13'}$.

The structure in FIGS. 33 and 34 is modified from that in FIG. 32 principally by reason of providing an extended component $396^{14'}$ that shifts the fulcrum location at $398^{14'}$ away from the axis $400^{14'}$ of the pinion gear $372^{14'}$. The first subassembly $310^{14'}$ operates substantially as the first subassembly $310^{13'}$ in FIG. 32.

In FIG. 33, one form of the second subassembly $312a^{14'}$ is shown consisting of a component $316a^{14'}$ that engages the component $154^{14'}$ around a portion of its perimeter at $402^{14'}$ and is connected thereto at $404^{14'}$. By extending and retracting the component $316a^{14'}$, as indicated by the double-headed arrow 406, the component $154^{14'}$ can be pushed/pulled in opposite directions around the axis $156^{14'}$ to thereby change the resistance to movement of the back rest component $16^{14'}$. Whereas the first subassembly $310^{14'}$ moves the component $154^{14'}$ in a predetermined path a first distance, the second subassembly either extends or reverses this movement.

As shown in FIG. 34, the user's weight is applied to the toothed rack $100^{14'}$ which transmits a force to a toothed region $408^{14'}$ on the component perimeter $402^{14'}$ through meshed intermediate gears $410^{14'}$, $412^{14'}$, with the latter in mesh with the toothed region $408^{14'}$. In this embodiment, the second subassembly $312b^{14'}$ has an associated component $316^{14'}$ that wraps against a curved surface on the gear $410^{14'}$ and is extendable and retractable, as indicated by the double-headed arrow $412^{14'}$ to pivot the component $154^{14'}$ in opposite directions around the axis $156^{14'}$.

As noted previously, the above are only representative examples of how the second subassembly might be incorporated, with it being understood that it could be incorporated into the other embodiments herein and virtually any other similarly operating structure using the same principles—that is, any construction that has components moving in predetermined/controlled paths by the first subassembly 310 to change resistance forces may be moved further in the paths or moved in reverse directions depending upon how the second subassembly is operated.

In those forms that utilize a fulcrum and a component bendable thereagainst, a relationship between the fulcrum and anchoring point can be changed in the same or different manners by the first and second subassemblies.

In an alternative form, as shown in FIGS. 35 and 36, a first subassembly $310^{15'}$ is shown corresponding to the structure in FIG. 6. A user's weight is directed through the component $70a^{15'}$ in the direction of the arrow 414, which pivots the link $72a^{15'}$ around the axis $84^{15'}$ to in turn advance the link $36a^{15'}$ in the direction of the arrow 418. The link $72^{15'}$ acts as a lever with a built-in differential due to the different pivot axis spacing P1, P2.

The second subassembly $312^{15'}$ has a movable component $316^{15'}$ that is extendable and retractable in the direction of the double-headed arrow 420 to thereby pivot the link $72a^{15'}$ in opposite directions about the axis $84^{15'}$.

In an alternative form, as shown in FIG. 37, the second subassembly $312^{16'}$ has a cylindrical component $422^{16'}$ which is fixed to a link member/lever $424^{16'}$, corresponding to the link member $72a^{15'}$ to move as one piece therewith. A component $316^{16'}$ is wrapped against and fixed to the member $422^{16'}$ whereby extension and retraction in the direction of the double-headed arrow 426 causes the link member $428^{16'}$, corresponding to the link member $36a^{15'}$ to move selectively in opposite directions, which causes the downstream interacting components to increase or decrease resistance to angular reorientation of an associated back rest component.

FIG. 38 discloses an adjusting assembly wherein an elongate toothed member $430^{17'}$ defines a fulcrum $432^{17'}$ against which a cantilevered component/leaf spring $434^{17'}$ is bent under the force of a component $436^{17'}$ urged in the direction of the arrow 438 under a user's sitting weight. The distance Y between the weight force application location and fulcrum $432^{17'}$ is changed by translating the elongate toothed member $430^{17'}$ selectively oppositely, as indicated by the double-headed arrow 440.

As cylindrical member $422^{17'}$ with a fixed link $424^{17'}$, corresponding to like numbered components in FIG. 37, is turned around an axis 442 to thereby advance a gear $444^{17'}$ in mesh with teeth 446. Depending upon the rotational direction, the fulcrum $432^{17'}$ is either advanced towards or away from the location at which the force is applied to the leaf spring $434^{17'}$ through the component $436^{17'}$.

While the first subassembly (not shown in detail) is responsible for a gross movement of the toothed member $430^{17'}$, manual turning of the cylindrical member $422^{17'}$, which is part of the second subassembly 312$^{17'}$, through the movement of the member 316$^{16'}$ effects finer adjustment.

FIG. 39 shows a structure similar to that in FIG. 38, and which may be part of either first or second subassemblies, with the exception that the corresponding cylindrical member 422$^{18'}$ has a perimeter with teeth 448$^{18'}$ thereon in mesh with an elongate toothed member 450$^{18'}$ Translation of the member 450$^{18'}$ in opposite directions, as indicated by the double-headed arrow 452, changes the dimension Y as shown in FIG. 38.

It should be noted that there is no limitation with respect to the degree of change in resistance that the individual first and second subassemblies 310, 312 are responsible for. While preferably the first subassembly 310 accomplishes a gross adjustment, it is possible that the manual adjustment through the second subassembly 312 may be even greater than that achieved through the first subassembly 310. The subassemblies 310, 312 can be complementary in virtually any manner that facilitates convenient setting of an equilibrium state for the apparatus 10.

In FIG. 40, a second subassembly 312$^{19'}$ is shown with an actuator 324c in the form of a grippable member 454$^{19'}$ that can be grasped and moved guidingly within a slot 456$^{19'}$ selectively in opposite directions, as indicated by the double-headed arrow 458, to thereby change the state of the second subassembly 312$^{19'}$.

In a further alternative form, as shown in FIG. 41, the actuator 324d is in the form of a graspable knob that is movable around an axis 460 to thereby change the state of the associated second subassembly 312$^{20'}$.

Mechanical advantage and strategically controlled differential movement of parts can be incorporated into each actuator so that excessive movement and force application is not required on the user's part.

In another form, as shown in FIG. 42, a seat 14$^{21'}$ has a peripheral edge 462 at which an actuator 324e is provided to be accessible at the peripheral edge 462, whereby a user is not required to awkwardly access the actuator as is typical of conventional constructions.

It should also be noted throughout that the back rest component may also be one that engages the neck as well as any discrete location on the user's back region and above.

The foregoing disclosure of specific embodiments is intended to be illustrative of the broad concepts comprehended by the invention.

The invention claimed is:

1. A chair, comprising:
   a backrest;
   a seat coupled with the backrest;
   a column coupled with the seat;
   a linkage statically attached to the backrest and rotatably attached below the seat;
   a leaf spring statically attached at one end and in contact with the linkage to provide a resistance to tilting of the backrest relative to the column;
   a first structure, wherein a portion of the first structure has an arc shape that includes one or more teeth; and
   a second structure in contact with the first structure, wherein a portion of the second structure includes one or more teeth,
   wherein the chair is configured such that, when a weight is applied to the seat, the one or more teeth of the second structure move along the one or more teeth of the first structure to provide an increased resistance to tilting of the backrest relative to the column.

2. The chair of claim 1, wherein the linkage is coupled with one or more pivot points at which the backrest is configured to tilt about, the one or more pivot points being distinct from a contact point between the linkage and the leaf spring.

3. The chair of claim 2, wherein a respective pivot point of the one or more pivot points at which the backrest is configured to tilt about is located at a location beneath the seat.

4. The chair of claim 3, wherein the respective pivot point is configured to be closer to the seat as compared to the contact point between the linkage and the leaf spring.

5. The chair of claim 1, further comprising a spring disposed beneath the seat and configured such that the one or more teeth of the second structure move further along the one or more teeth of the first structure when a heavier weight is applied to the seat.

6. The chair of claim 1, wherein the seat in its entirety is configured to receive all of the weight, wherein all of the weight is configured to cause the second structure to move along the one or more teeth of the first structure to and provide an increased resistance to tilting of the backrest relative to the column.

7. The chair of claim 1, wherein the leaf spring is hidden within a height-adjustment housing of the chair.

8. The chair of claim 1, wherein the linkage includes a first end connected to the backrest and a second end in physical contact with the leaf spring at a contact point.

9. The chair of claim 1, wherein the leaf spring is oriented within a same horizontal plane as the seat.

10. The chair of claim 1, wherein the linkage is configured to be in contact with an additional leaf spring, distinct from the leaf spring, the additional leaf spring configured to provide an additional resistance to tilting of the backrest relative to the column.

11. The chair of claim 1, wherein the column is coupled with one or more wheels for moving the chair.

12. The chair of claim 1, wherein the chair is configured such that, when the weight is applied to the seat, the one or more teeth of the second structure, a pivot point at which the backrest is configured to tilt relative to the column, and the linkage are configured to move together.

13. The chair of claim 1, wherein the chair is configured such that, when the weight is applied to the seat, movement of a fulcrum point of the leaf spring is caused by the one or more teeth of the second structure moving along the one or more teeth of the first structure.

14. The chair of claim 13, wherein the chair is configured such that:
   before the movement of the fulcrum point of the leaf spring, the fulcrum point of the leaf spring is configured to be between (i) a pivot point at one end of the linkage, the pivot point being a point at which the backrest is configured to tilt relative to the column and (ii) another end of the linkage at which the linkage connects with the backrest.

15. The chair of claim 14, wherein the chair is configured such that:
   after the movement of the fulcrum point of the leaf spring, the fulcrum point of the leaf spring is configured to remain between (i) the pivot point at the one end of the linkage and (ii) the other end of the linkage.

16. The chair of claim 1, wherein the linkage is an integrally-formed linkage.

17. The chair of claim 1, wherein the leaf spring is one or both of (i) cantilevered and (ii) not coupled to a coiled spring.

18. The chair of claim 1, wherein the first structure is fixed translationally to the column.

19. The chair of claim 1, including another leaf spring statically attached at one end and in contact with the linkage to provide further resistance to tilting of the backrest relative to the column, wherein the other leaf spring is coplanar with the leaf spring.

20. The chair of claim 1, further comprising an additional leaf spring, and the leaf spring and the additional leaf spring are in contact with an elongate, wedge-shaped actuating component that is configured to assist in providing a resistance to tilting of the backrest relative to the column.

21. A process for assembling a chair, the process comprising:
providing a backrest;
coupling a seat with the backrest;
coupling a column with the seat;
statically attaching a linkage to the backrest, the linkage being rotatably attached below the seat;
placing a leaf spring that is statically attached at one end in contact with the linkage to provide a resistance to tilting of the backrest relative to the column;
providing a first structure, wherein a portion of the first structure has an arc shape that includes one or more teeth; and
providing a second toothed structure in contact with the first structure, wherein a portion of the second structure includes one or more teeth,
wherein the chair is configured such that, when a weight is applied to the seat, the one or more teeth of the second structure move along the one or more teeth of the first structure to provide an increased resistance to tilting of the backrest relative to the column.

22. The process of claim 21, wherein the chair is configured such that, after assembly, when the weight is applied to the seat, the one or more teeth of the second structure, a pivot point at which the backrest is configured to tilt relative to the column, and the linkage are configured to move together.

23. The process of claim 21, wherein the chair is configured such that, after assembly, when the weight is applied to the seat, movement of a fulcrum point of the leaf spring is caused by the one or more teeth of the second structure moving along the one or more teeth of the first structure.

24. The process of claim 23, wherein the chair is configured such that, after assembly:
before the movement of the fulcrum point of the leaf spring, the fulcrum point of the leaf spring is configured to be between (i) a pivot point at one end of the linkage, the pivot point being a point at which the backrest is configured to tilt relative to the column and (ii) another end of the linkage at which the linkage connects with the backrest.

25. A weight-based tilt-resistance assembly configured for use in a chair, the weight-based tilt-resistance assembly comprising:
a linkage statically attached to a backrest of a chair, the chair also including a seat coupled with the backrest and a column coupled with the seat;
a leaf spring statically attached at one end and in contact with the linkage to provide a resistance to tilting of the backrest relative to the column;
a first structure, wherein a portion of the first structure has an arc shape that includes one or more teeth; and
a second structure in contact with the first structure, wherein a portion of the second structure includes one or more teeth,
wherein the chair is configured such that, when a weight is applied to the seat, the one or more teeth of the second structure move along the one or more teeth of the first structure to provide an increased resistance to tilting of the backrest relative to the column.

26. The weight-based tilt-resistance assembly of claim 25, wherein the chair is configured such that, when the weight is applied to the seat, the one or more teeth of the second structure, a pivot point at which the backrest is configured to tilt relative to the column, and the linkage are configured to move together.

27. The weight-based tilt-resistance assembly of claim 25, wherein the chair is configured such that, when the weight is applied to the seat, movement of a fulcrum point of the leaf spring is caused by the one or more teeth of the second structure moving along the one or more teeth of the first structure.

28. The weight-based tilt-resistance assembly of claim 27, wherein the chair is configured such that:
before the movement of the fulcrum point of the leaf spring, the fulcrum point of the leaf spring is configured to be between (i) a pivot point at one end of the linkage, the pivot point being a point at which the backrest is configured to tilt relative to the column and (ii) another end of the linkage at which the linkage connects with the backrest.

29. The weight-based tilt-resistance assembly of claim 28, wherein the chair is configured such that:
after the movement of the fulcrum point of the leaf spring, the fulcrum point of the leaf spring is configured to remain between (i) the pivot point at the one end of the linkage and (ii) the other end of the linkage.

30. The weight-based tilt-resistance assembly of claim 25, wherein the leaf spring is one or both of (i) cantilevered and (ii) not coupled to a coiled spring.

* * * * *